(12) United States Patent
Liaw et al.

(10) Patent No.: US 7,853,740 B2
(45) Date of Patent: Dec. 14, 2010

(54) KEYBOARD VIDEO MOUSE (KVM) SWITCH FOR TRANSMISSION OF HIGH QUALITY AUDIO WITH 64-BIT DATA PACKETS WHEREIN TRANSMISSIONS OF DATA PACKETS ARE WHEREIN A DEFINED TIME LIMIT

(75) Inventors: Yee Liaw, Warren, NJ (US); Lech Glinski, Morris Plains, NJ (US)

(73) Assignee: RIIP, Inc., Wilmington, DE (US)

( * ) Notice: Subject to any disclaimer, the term of this patent is extended or adjusted under 35 U.S.C. 154(b) by 1919 days.

(21) Appl. No.: 10/665,723

(22) Filed: Sep. 18, 2003

(65) Prior Publication Data

US 2005/0066000 A1 Mar. 24, 2005

(51) Int. Cl.
*G06F 15/16* (2006.01)
*G06F 3/00* (2006.01)
*G06F 5/00* (2006.01)
*G06F 13/00* (2006.01)

(52) U.S. Cl. ............... 710/62; 710/38; 710/64; 710/72; 710/100; 710/300; 345/156; 345/213; 307/147; 709/204; 709/231

(58) Field of Classification Search ............ 710/62, 710/100, 38, 64, 72, 300; 345/213, 156; 307/147; 709/204, 231
See application file for complete search history.

(56) References Cited

U.S. PATENT DOCUMENTS

| | | | |
|---|---|---|---|
| 5,257,390 A | 10/1993 | Asprey | |
| 5,268,676 A | 12/1993 | Asprey et al. | |
| 5,353,409 A | 10/1994 | Asprey et al. | |
| 5,721,842 A | 2/1998 | Beasley | |
| 5,732,212 A | 3/1998 | Perholtz | |
| 5,884,096 A | 3/1999 | Beasley | |
| 5,937,176 A | 8/1999 | Beasley | |
| 5,978,389 A | 11/1999 | Chen | |

(Continued)

FOREIGN PATENT DOCUMENTS

EP 1075111 2/2001

(Continued)

OTHER PUBLICATIONS

International Search Report for PCT/US04/29720, Jul. 3, 2007.

(Continued)

*Primary Examiner*—Tammara Peyton

(57) ABSTRACT

The present invention provides an intelligent, modular multimedia computer management system for coupling a series of remote computers to one or more user workstations to allow each user workstation to selectively access and control one or more remote computers. The computer management system incorporates a centralized switching system that receives keyboard, cursor control device, audio, and auxiliary peripheral device signals from the user workstation and transmits and applies the signals to the remote computer in the same manner as if the keyboard, cursor control device, audio input source, or auxiliary peripheral device of the user workstation were directly coupled to the remote computer. Also, the user workstation receives audio signals and auxiliary peripheral device signals from the remote computer. In addition, the multimedia computer management system transmits video signals from the remote computer over an extended range for display on the video monitor of the user workstation.

13 Claims, 12 Drawing Sheets

U.S. PATENT DOCUMENTS

| | | | |
|---|---|---|---|
| 6,112,264 | A | 8/2000 | Beasley |
| 6,119,148 | A | 9/2000 | Chen |
| 6,138,191 | A | 10/2000 | Fujii et al. |
| 6,307,543 | B1 * | 10/2001 | Martin ................... 345/213 |
| 6,345,323 | B1 | 2/2002 | Beasley |
| 6,378,009 | B1 | 4/2002 | Pinkston, II et al. |
| 6,385,666 | B1 | 5/2002 | Thornton et al. |
| 6,388,658 | B1 | 5/2002 | Ahern et al. |
| 6,557,170 | B1 | 4/2003 | Wilder et al. |
| 6,633,934 | B1 * | 10/2003 | Thornton ................. 710/100 |
| 6,771,213 | B2 | 8/2004 | Durst |
| 6,891,822 | B1 * | 5/2005 | Gubbi et al. ............. 370/345 |
| 7,684,483 | B2 * | 3/2010 | Coleman .............. 375/240.01 |
| 2002/0116652 | A1 | 8/2002 | Chen |
| 2003/0088655 | A1 | 5/2003 | Leigh |
| 2004/0083302 | A1 | 4/2004 | Thornton |

FOREIGN PATENT DOCUMENTS

| | | |
|---|---|---|
| EP | 1158414 | 11/2001 |
| WO | 9419749 | 9/1994 |

OTHER PUBLICATIONS

Trial Transcript, *Apex v. Raritan*, Southern District of New York, Case No. 01-CV-4435, vol. 7, Jan. 2002.
Tron International, Inc., KVM Products Catalogs, 1997.
Tron International, Inc., Products Catalogs, 1996.
Tron International, Inc., Product Brochure, 1997, 4 pages.
Unisys, PW2 Advantage Series Rackmount Server, 1995.
Yee Liaw Deposition Transcript, Case No. 01-CV-4435, Mar. 3, 2005.
Yee-Shung Liaw Deposition Transcript, Case No. 01-CV-4435, Dec. 6, 2001.
The list of docket reports in the litigation: *Avocent Redmond Corp. v. Raritan Computer, Inc.*, Civil Action No. 1:01-CV-04435(PKC), United States District Court for the Southern District of New York.
Adder, Products Brochure, APX 304572-304579, Apr. 1, 1998, 8 pages.
AdderViewOSD, Products Brochure, RCI 173246-173279, Aug. 1, 2002.
Avocent's Pre-Markman Hearing Memorandum in Support of its Proposed Claim Constructions (Dec. 15, 2004).
Avocent Redmond's Answering Pre-Markman Hearing Briefing (Jan. 18, 2005).
Avocent Redmond's Supplemental Responses to Raritan's Second Set of Post-Remand Interrogatories (Nos. 15R-17R), Mar. 14, 2005.
Apex, OutLook User Guide, 1997.
Apex et al., Products Brochure, APX 082949-082971, 1996.
Apex PC Solutions, Users Guide, 1993.
Apex, Products Brochure, APX 018983-018996, Jan. 7, 1997.
Apex, Products Brochure, APX 019103-019121, 1995-1996.
Apex, Products Brochure, APX 056304-056346, Oct. 1, 1998.
Apex et al, Products Brochure, APX 316564-316621.
Apex et al, Products Brochure, APX 316848-316909.
Apex et al, Products Brochure, APX 316910-316969.
Apex's Sales Brochure, Sep. 1, 1998, 1 page.
Apex, SwitchBack User Guide, 1995.
Apex's Motion on the PolyCon Catalog and Supporting Memorandum, Jan. 15, 2002.
Apex's Proposed Markman Findings, Jan. 25, 2002.
Appendix1 to Apex's Proposed Markman Findings, Jan. 25, 2002.
Badman, Switching into High Gear, Network Computing, Apr. 30, 2001.
Belkin, The OmniView PRO User Manual, Jul. 16, 2001.
Bruce McNair Deposition Transcript, Case No. 01-CV-4435, May 5, 2005.
Compaq, White papers, 1996, APX 083313-APX 083326, APX 083335-APX 083389.
Ching-I Hsu Deposition Transcript, Case No. 01-CV-4435, Mar. 11, 2005.
Cybex, Director Installer/User Guide, Nov. 1996.
Cybex, 4×P & 1×P KVM SWITCHES Guide to Applications, 1996.
Datavision, Product Brochure, 1992, 3 pages.
Declaration of Joseph C. McAlexander in Support of Apex's Motion for a Preliminary Injunction, Sep. 17, 2001.
Declaration of Joseph C. McAlexander, III in the Civil Action No. 01-CV-4435, Dec. 15, 2004.
Declaration of Sharad Malik, Ph. D., Jan. 8, 2002.
Declaration of Sharad Malik, Ph.D. (Jan. 18, 2005).
Defendant Raritan Computer Inc.'s Claim Construction Statement (Dec. 15, 2004).
Defendant Raritan Computer Inc.'s Motion for Partial Summary Judgment (Jan. 8, 2002).
Defendant Raritan Computer Inc.'s Proposed Findings of Fact and Conclusions of Law, Apr. 27, 2005.
Defendant Raritan Computer Inc.'s Reply to Avocent's Proposed Claim Constructions (Jan. 18, 2005).
Defendant Raritan Computer Inc.'s Reply to Avocent's Proposed Claim Constructions (Jan. 18, 2005).
Defendant Raritan Computer, Inc.'s Response to Plaintiff's Second Set of Interrogatories (Nos. 9-12), Oct. 30, 2001.
Defendant Raritan Computer, Inc.'s Second Set of Interrogatories to Plaintiff Apex, Nov. 16, 2001.
Defendant Raritan Computer, Inc.'s Supplemental Response to Plaintiffs First Set of Interrogatories (Nos. 9-12), Aug. 31, 2001.
Defendant Raritan Computer, Inc.'s Supplemental Response to Plaintiffs Second Set of Interrogatories (Nos. 9-12), Dec. 12, 2001.
DEI, Central Control of Multiple PCs Without Massive Cabling, product brochure, Nov. 1992.
Expert Report by Joseph C. McAlexander Regarding Infringement and Validity of U.S. Patent Nos. 5,884,096, 5,937,176 and 6,112,264, Jan. 3, 2001.
Expert Report by Joseph C. McAlexander Regarding Infringement and Validity of U.S. Patent Nos. 5,884,096, 5,937,176 and 6,112,264, Jan. 3, 2001. Claim Charts.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
File History of Reissue U.S. Patent No. 5,732,212, Apr. 11, 2002. Part 1.
File History of Reissue U.S. Patent No. 5,732,212, Apr. 11, 2002. Part 2.
File History of U.S. Appl. No. 10/032,325, filed Jun. 14, 2004.
Findings and Conclusions, *Apex v. Raritan*, Civil Action No. 01-CV-0035, Feb. 25, 2002.
Investor's Business Daily, Box Keeps Monitors, Mice to a Minimum, Sep. 8, 1997.
Joseph C. McAlexander Deposition Transcript, Case No. 01-CV-4435, Apr. 27, 2005.
KVM Switch History, Aug. 2, 2002, 2 pages.
KVM Switches Roundup, Windows NT Magazine, Jul. 1997.
Lan Times, The beauty of Apex is a two-sided story, Nov. 20, 1995.
Lightwave Communications, Inc., Product Brochure, APX 304594-304605, Jun. 1, 1998.
Lu, E&J Int. 4-Port KVM Switch, Jul. 4, 2001.
Marksman Transcript, *Avocent v. Raritan*, Civil Action No. 4435, Feb. 3, 2005.
Marksman Transcript, *Avocent v. Raritan*, Civil Action No. 4435, Feb. 4, 2005.
Memorandum and Order on Marksman issues, Case No. 01-CV-4435, (Mar. 11, 2005).
Network Computing, Product Brochure, May 15, 1995, 5 pages.
Network Technologies Inc., Product Brochure, 1998, 2 pages.
Network World, advisement, Jul. 6,1992.
Ocean Isle, Reachout Product Brochure, RCI 172996-173006, Jun. 1994.
PC World, New Products, May 1995, 2 pages.

PolyCon GmbH Data System Inc., product catalogs, APX 024328-042697, prior to Spring, 1995.
Press Release, Maintain Error-Free Central Control of 128 PCs from One Set of Keyboard, Mouse, and Monitor, Feb. 4, 1999, 1 page.
Protest Under 37 CFR 1.291 U.S. Appl. No. 08/969,723, filed Feb. 13, 1999.
Raritan, CompuSwitch, Mar. 16, 1998, 1 page.
Raritan, Dominion KSX, Jul. 19, 2003, RCI 139356-139371.
Raritan, Dominion KX and Dominion KSX, 2004, 181193-181211.
Raritan, MasterConsole MXU2, Jul. 31, 2001.
Raritan, MasterConsole II, User's Manual, 2000.
Raritan, Paragon UMT2161, RCI 147483-147505, Jul. 5, 2002.
Raritan, Paragon User's Guide, Jun. 15, 2000.
Raritan, Paragon II User Manual, 2004.
Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.
Rextron, Product Brochure, Aug. 1, 2002, 5 pages.
Rose Electronics, "Master Switch Installation and Operation Manual," 1991.
Rose Electronics, UltraView Installation and Operation Manual, 1991-1997.
Rose Electronics, Ultra View, Aug. 1, 2002, RCI 173332-173336.
Startech Computer Products Ltd., Product Press Release, APX 304618-304619, Feb. 1998.
Supplemental Expert Report of Bruce McNair Regarding United States Patent Nos. 5,884,096 & 6,112,264 and 5,937,176, Apr. 17, 2005.
Supplemental Expert Report of Joseph C. McAlexander Regarding Infringement of U.S. Patent Nos. 5,884,096, 5,937,176 and 6,112,264, Mar. 22, 2005.
Supplemental Expert Report of Michael H. Davis, Apr. 18, 2005.
SwitchCom, ProServer, Aug. 1, 2002, 2 pages.
Tikkler, Belkin OmniView SE 4-Port KVM Switch, Nov. 8, 2000.
Tony Dekerf and Gary D. Davis, "A Close Look At Modern Keyboard, Video & Mouse Switches," 1995.
Trial Transcript, *Apex* v. *Raritan*, Southern District of New York, Case No. 01-CV-4435, vol. 1, Jan. 2002.
Trial Transcript, *Apex* v. *Raritan*, Southern District of New York, Case No. 01-CV-4435, vol. 2, Jan. 2002.
Trial Transcript, *Apex* v. *Raritan*, Southern District of New York, Case No. 01-CV-4435, vol. 3, Jan. 2002.
Trial Transcript, *Apex* v. *Raritan*, Southern District of New York, Case No. 01-CV-4435, vol. 4, Jan. 2002.
Trial Transcript, *Apex* v. *Raritan*, Southern District of New York, Case No. 01-CV-4435, vol. 5, Jan. 2002.
Trial Transcript, *Apex* v. *Raritan*, Southern District of New York, Case No. 01-CV-4435, vol. 6, Jan. 2002.

* cited by examiner

KEYBOARD VIDEO MOUSE (KVM) SWITCH FOR TRANSMISSION OF HIGH QUALITY AUDIO WITH 64-BIT DATA PACKETS WHEREIN TRANSMISSIONS OF DATA PACKETS ARE WHEREIN A DEFINED TIME LIMIT

FIELD OF THE INVENTION

The present invention relates generally to a computer management system for coupling a plurality of remote computers (e.g., personal computers, servers, etc.) to one or more user workstations to allow a system user to selectively access or control the plurality of remote computers using the user workstation's keyboard, video monitor, mouse, audio output device, audio input device or input/output ("I/O") module. Specifically, audio generated internal to or external to (but physically near) the remote computer may be heard at the user workstation and audio created at the user workstation may be heard at the remote computer utilizing audio input and output devices coupled to the computer management system or the remote computer. Furthermore, I/O modules located at either the user workstation or the remote computer allow auxiliary peripheral devices (i.e., serial devices, parallel devices, Universal Serial Bus ("USB") devices, switch contacts, auxiliary audio channels, etc.) to be accessed and controlled bi-directionally by either the user workstation or the remote computer.

BACKGROUND OF THE INVENTION

In a typical multiple computer environment, a Local Area Network ("LAN") or Wide Area Network ("WAN") allows for each computer, or server, to be connected to several other computers such that the resources of each connected computer, or server, are available to each of the connected computers. In this networked environment, a dedicated keyboard, video monitor, mouse, audio output device, audio input device, and/or auxiliary peripheral devices may be employed for each computer or server.

To maintain proper operation of the LAN or WAN, the system administrator must maintain and monitor the individual computers including the servers. This maintenance frequently requires the system administrator to perform numerous tasks at the user console that is associated with and physically located at the computer or server. For example, to reboot a computer or to add or delete files, the system administrator is often required to operate the computer or server using its local, attached keyboard, mouse, video monitor, audio devices, and/or auxiliary peripheral devices, which may be located at a substantial distance from the system administrator's computer and from other computers or servers connected to the LAN or WAN. Consequently, to accomplish the task of system administration, the system administrator must often physically relocate to the user consoles of remote computers and servers.

One alternative to physical relocation of the system administrator is the installation of dedicated cables that connect each remote computer or server to the system administrator's computer in a manner that allows the system administrator to fully access and operate the remote computers or servers. However, such an alternative requires substantial wiring and wire harnessing, both of which may require tremendous cost that increases each time a new computer is added to the system. Additionally, as the distance between the system administrator's computer and the computer equipment increases, a decrease in the quality of the transmitted signal often results. Thus, dedicated cables between the system administrator's computer and remote computer equipment may not provide a feasible alternative.

In addition to the ease of managing a networked computer environment, space is also an important concern for many networked computer environments, especially large-scale operations such as data-centers, server-farms, web-hosting facilities, and call-centers. These computer environments typically require space to house a keyboard, video monitor, mouse, audio output device, audio input device and/or auxiliary peripheral devices for each computer in addition to all of the wiring required to connect and power each component to the respective computer. Furthermore, additional space is required to house the network interface components (e.g., a hub or other connection device) and wiring (i.e., the wiring that physically connects the computers together either directly or via network interface components). As more equipment is added to a computer network, it becomes more probable that the space required to house the equipment and associated cabling will exceed the space allotted for the computer network. Therefore, network architecture, equipment size, and available space are important issues when designing an effective computer network environment.

One method of reducing the amount of space required to house a computer network is to eliminate user interface devices (i.e., keyboard, video monitor, mouse, audio output device, audio input device, auxiliary peripheral devices, etc.) that are not essential for proper operation of the computer network. User interface devices, and associated wiring, may be eliminated if a system administrator is able to access the remote computers from the system administrator's computer, thereby eliminating the need for dedicated user interface equipment and its associated wiring.

Allowing a system administrator to operate remote computers or servers from the system administrator's computer eliminates the need for physical relocation of the system administrator to perform system maintenance or administration. Also, this capability decreases the amount of space required to house the computer network by eliminating unnecessary devices.

The following references, which are discussed below, were found to relate to the field of computer management systems: Asprey U.S. Pat. No. 5,257,390 ("Asprey '390 patent"), Asprey U.S. Pat. No. 5,268,676 ("Asprey '676 patent"), Asprey U.S. Pat. No. 5,353,409 ("Asprey '409 patent), Perholtz et al. U.S. Pat. No. 5,732,212 ("Perholtz"), Chen U.S. Pat. No. 5,978,389 ("Chen '389 patent"), Chen U.S. Pat. No. 6,119,148 ("Chen '148 patent"), Fujii et al. U.S. Pat. No. 6,138,191 ("Fujii"), Beasley U.S. Pat. No. 6,345,323 ("Beasley"), Pinkston, II et al. U.S. Pat. No. 6,378,009 ("Pinkston"), Thornton et al. U.S. Pat. No. 6,385,666 ("Thornton"), Ahern et al. U.S. Pat. No. 6,388,658 ("Ahern"), and Wilder et al. U.S. Pat. No. 6,557,170 ("Wilder").

The Asprey '390 patent discloses an extended range communications link for coupling a computer to a keyboard, video monitor, and/or mouse that is located remotely from the computer. The end of the link that is coupled to the computer has a first signal conditioning circuit that conditions the keyboard, video monitor and mouse signals. Conditioning the video monitor signals includes reducing their amplitude in order to minimize the amount of "crosstalk" that is induced on the conductors adjacent to the video signal conductors during transmission of the video signals. This signal conditioning circuit is coupled to an extended range cable having a plurality of conductors that transmits the conditioned signals and power and logic ground potentials to a second signal conditioning circuit. This second signal conditioning circuit restores the video signals to their original amplitude.

The Asprey '676 patent discloses a communications link for use between a computer and a display unit, such as a video monitor, that allows these two components to be located up to three hundred (300) feet apart. An encoder located at the computer end of the communications link receives analog red, green and blue signals from the computer and inputs each signal to a discrete current amplifier that modulates the signal current. Impedance matching networks then match the impedance of the red, green and blue signals to the impedance of the cable and transmit the signals to discrete emitter-follower transistors located at the video monitor end of the cable. These transistors amplify the signal prior to inputting it to the video monitor. Concurrently, the horizontal synchronization signal is inputted to a cable conductor and its impedance is not matched to the impedance of the cable, thereby allowing the conductor to attenuate the horizontal synchronization signal and reduce noise radiation.

The Asprey '409 patent discloses an extended range communications link for transmitting transistor-transistor logic video signals from a local computer to a video monitor located up to a thousand (1,000) feet from the computer. The link includes a first signal conditioning circuit located at the computer end of the link for reducing the amplitude of the video signals received from the computer and biasing them to a selected potential, whereafter, they are applied to discrete conductors of the link. A second signal conditioning circuit receives and reconstructs the transmitted video signals prior to inputting them to the video monitor. According to the Asprey '409 patent, performance of this process reduces the appearance of high frequency video noise on the keyboard clock conductor of the transmission cable, thereby preventing keyboard errors. The Chen '389 patent discloses a video signal multiplexing device for use with a single video monitor that is capable of selecting one video signal from a plurality of computers for display on the video monitor. The Chen system includes three sets of switches for receiving the red, green, and blue components of the video signals from each computer. When a user selects the desired remote computer, an interface circuit generates a control signal that directs the three sets of switches to select the corresponding video signals from the plurality of computers. The selected signals are then transmitted to three sets of switch circuits and current amplifying circuits that provide input and output impedance matching, respectively. The selected video signal is then displayed on the video monitor.

Perholtz discloses a method and apparatus for coupling a local user workstation, including a keyboard, mouse, and/or video monitor, to a remote computer. Perholtz discloses a system wherein the remote computer is selected from a menu displayed on a standard size personal computer video monitor. Upon selection of a remote computer by the system user, the remote computer's video signals are transmitted to the local user workstation's video monitor. The system user may also control the remote computer utilizing the local user workstation's keyboard and monitor. The Perholtz system is also capable of bi-directionally transmitting mouse and keyboard signals between the local user workstation and the remote computer. The remote computer and the local user workstation may be connected either via the Public Switched Telephone System ("PSTN") and modems or via direct cabling.

The Chen '148 patent discloses a video signal distributor that receives, processes and distributes video signals received from one or more computers to a plurality of video monitors. The video signal distributor includes three transistor-based voltage amplifying circuits to individually amplify the red, green and blue video signals received from each computer prior to transmitting these signals to a video monitor. The video signal distributor also includes a synchronization signal buffering device that receives horizontal and vertical synchronization signals from each computer and generates new synchronization signals based upon the quantity of video signals that are output to the video monitors.

Fujii discloses a system for selectively operating a plurality of computers that are connected to one common video monitor. The Fujii system includes a single interface device for entering data in any one of the plurality of connected computers. The system also includes a main control circuit, which is connected to the interface device, and a selection circuit for providing the entered data and receiving the video signals from the selected computer.

Similar to Perholtz, Beasley discloses a specific implementation of a computerized switching system for coupling a local keyboard, mouse and/or video monitor to one of a plurality of remote computers. In particular, a first signal conditioning unit includes an on-screen programming circuit that displays a list of connected remote computers on the local video monitor. To activate the menu, a user depresses, for example, the "print screen" key on the local keyboard. The user selects the desired computer from the list using the local keyboard and/or mouse.

According to Beasley, the on-screen programming circuit requires at least two sets of tri-state buffers, a single on-screen processor, an internal synchronization generator, a synchronization switch, a synchronization polarizer, and overlay control logic. The first set of tri-state buffers couples the red, green, and blue components of the video signals received from the remote computer to the video monitor. That is, when the first set of tri-state buffers are energized, the red, green, and blue video signals are passed from the remote computer to the local video monitor through the tri-state buffers. When the first set of tri-state buffers are not active, the video signals from the remote computer are blocked. Similarly, the second set of tri-state buffers couples the outputs of the single on-screen processor to the video monitor. When the second set of tri-state buffers is energized, the video output of the on-screen programming circuit is displayed on the local video monitor. When the second set of tri-state buffers is not active, the video output from the on-screen programming circuit is blocked. Alternatively, if both sets of tri-state buffers are energized, the remote computer video signals are combined with the video signals generated by the on-screen processor prior to display on the local video monitor.

The on-screen programming circuit disclosed in Beasley also produces its own horizontal and vertical synchronization signals. To dictate which characters are displayed on the video monitor, the CPU sends instructional data to the on-screen processor. This causes the on-screen processor to retrieve characters from an internal video RAM for display on the local video monitor.

The overlaid video image produced by the on-screen processor, namely a Motorola MC141543 on-screen processor, is limited to the size and quantity of colors and characters that are available with the single on-screen processor. In other words, the Beasley system is designed to produce an overlaid video that is sized for a standard size computer monitor (i.e., not a wall-size or multiple monitor type video display) and is limited to the quantity of colors and characters provided by the single on-screen processor.

During operation of the Beasley system, a remote computer is chosen from the overlaid video display. Thereafter, the first signal conditioning unit receives keyboard and mouse signals from the local keyboard and mouse and generates a data packet for transmission to a central cross point switch. The cross point switch routes the data packet to the second signal conditioning unit, which is coupled to the selected remote computer. The second signal conditioning unit then routes the keyboard and mouse command signals to the keyboard and mouse connectors of the remote computer. Similarly, video signals produced by the remote computer are routed from the remote computer through the second signal conditioning unit, the cross point switch, and the first signal conditioning unit to the local video monitor. The horizontal and vertical synchronization video signals received from the remote computer are encoded on one of the red, green or blue video signals. This encoding reduces the quantity of cables required to transmit the video signals from the remote computer to the local video monitor.

Pinkston discloses a keyboard, video, mouse ("KVM") switching system capable of coupling to a standard network (e.g., a Local Area Network) operating with a standard network protocol (e.g., Ethernet, TCP/IP, etc.). The system of Pinkston couples a central switch to a plurality of computers and at least one user station having a keyboard, video monitor, and mouse. The central switch includes a network interface card ("NIC") for connecting the central switch to a network, which may include a number of additional computers or remote terminals. Utilizing the Pinkston system, a user located at a remote terminal attached to the network may control any of the computers coupled to the central switch.

Thornton discloses a computer system having remotely located I/O devices. The system of Thornton includes a computer, a first interface device, and a remotely located second interface device. The first interface device is coupled to the computer and the second interface device is coupled to a video monitor and as many as three I/O devices (e.g., keyboard, mouse, printer, joystick, trackball, etc.) such that a human interface is created. The first and second interface devices are coupled to each other via a four wire cable. The first interface device receives video signals from the connected computer and encodes the horizontal and vertical synchronization signals of the received video signals onto at least one of the red, green, and blue components of the video signal. The first interface device also encodes the I/O signals received from the connected computer into a data packet for transmission over the fourth wire in the four wire cable. Thereafter, the encoded, red, green, and blue components of the video signals and the data packet are transmitted to the second interface device located at the human interface. The second interface device decodes the encoded red, green, and blue components of the video signal, separates the encoded horizontal and vertical synchronization signals, and decodes the I/O signal data packet. The video signal and the synchronization signals are then output to the video monitor attached to the second interface and the decoded I/O signals are routed to the proper I/O device, also attached to the second interface. The second interface device may optionally include circuitry to encode I/O signals received from the I/O devices attached to the second interface for transmission to the first interface device.

Ahern discloses a switching system for interconnecting a plurality of computer user terminals with a plurality of computers via a computer network, thereby allowing a user to access any computer from any computer user terminal. Each computer is interfaced to the switching system via a computer interface, which conditions the bi-directional keyboard and mouse signals and the uni-directional video signals for transmission over a single CAT 5 cable to a central switch. The computer interface also encodes the bi-directional keyboard and mouse signals with the horizontal and vertical synchronization signals into a data packet for transmission over one of the twisted pair in the CAT 5 cable. The uni-directional red, green, and blue components of the video signals are transmitted as analog signals over the remaining three twisted pair in the CAT 5 cable. The central switch contains a series of digital cross point switches for routing the encoded data packet to the intended user interface module, as well as a series of analog cross point switches for routing the red, green, and blue components of the video signals to the same user interface module. Each user interface module is attached to the central switch via a single CAT 5 cable. The user interface module decodes the bi-directional keyboard and mouse signals and outputs them to the keyboard and mouse attached to the user interface. Similarly, the user interface module decodes the horizontal and vertical synchronization signals and outputs the resulting signals as well as the analog red, green, and blue components of the video signal to the video monitor attached to the user interface.

Wilder discloses a keyboard, video, mouse and power switching ("KVMP") apparatus for connecting a plurality of computers to one or more user stations having an attached keyboard, video monitor, and mouse. On-screen display ("OSD") circuitry embedded within the KVMP switching apparatus allows a user located at a user station to select and operate any one of the computers utilizing the keyboard, video monitor, and mouse attached to the user station. Secondary switching circuitry located within the KVMP switching apparatus allows a user located at a user station to additionally control the electrical power supply supplying each computer.

In view of the foregoing, a need clearly exists for a multimedia-capable remote computer management system that minimizes expensive, space-consuming, external computer hardware, while providing full access and control to multiple remote computers. Such a system should also allow one or more user workstations to access any one of a plurality of remote computers and its associated audio and auxiliary peripheral devices. Furthermore, such a system should greatly enhance the ability of information technology personnel to manage multiple computers or servers in both small-scale computer centers and large-scale operations such as data-centers, server-farms, web-hosting facilities, and call-centers.

SUMMARY OF THE INVENTION

It is often desirable to allow one or more remote computers to be accessed and controlled via one or more local sets of peripheral devices including, but not limited to, a keyboard, video monitor, cursor control device, audio output device, audio input device and auxiliary peripheral devices (i.e., serial devices, parallel devices, USB devices, switch contacts, auxiliary audio channels, etc.). Since the majority of computers in use today are either International Business Machines ("IBM") computers or clones of an IBM computer, many computers use identical or similar electrical connectors and communication protocols (e.g., PS/2) to connect a peripheral device to a computer. An IBM-compatible computer typically contains one type of electrical connector for each type of peripheral device to which the computer will be connected. Generally, the cables that interface such peripheral devices to the respective electrical connector are approximately six feet in length, thereby limiting the distance from the computer at which the peripheral devices may be located.

In many circumstances, it may be desirable to separate the peripheral devices from the computer due to space constraints. However, separating a computer from its peripheral devices is likely to increase cabling costs. In addition, transmitting signals such as keyboard, video, cursor control device, audio or auxiliary peripheral device signals over distances greater than fifteen feet is likely to degrade the electrical characteristics of the signal resulting in decreased reliability of keyboard and cursor control device commands, low quality video and audio, and degraded auxiliary peripheral device signals. This degradation occurs for a few reasons including the induction of "noise", or "crosstalk", between adjacent conductors and an increase in the impedance encountered by the transmitted signal.

In addition to extending the distance between a computer and its peripheral devices, it is also convenient to access and operate more than one computer from one set of peripheral devices. Again, this feature is desirable when space is limited and the use of one set of peripheral devices to control multiple computers eliminates the space required to house a dedicated set of peripheral devices for each computer to be accessed and controlled. Also, the ability to access and control one or more remote computers from one local set of peripheral devices eliminates the need to physically relocate to the remote computer to perform system administration or maintenance for that computer.

The present invention provides an intelligent, modular computer management system that enables several simultaneous users to access, control, and operate numerous remote computers and their associated peripheral devices from one or more sets of local peripheral devices. This computer management system allows a system administrator to access a remote computer from one set of peripheral devices, preferably located at the system administrator's desk, without physically traveling to the remote computer. Furthermore, if the remote computer does not have a local user, the present invention eliminates the need for a second set of peripheral devices at the remote computer.

The present invention also provides compatibility between various operating systems and/or communication protocols. The present invention allows the same set of local peripheral devices to access and control remote computers executing a variety of operating systems and protocols, including but not limited to, those manufactured by Microsoft Corporation ("Microsoft") (Windows), Apple Computer, Inc. ("Apple") (Macintosh), Sun Microsystems, Inc. ("Sun") (Unix), Digital Equipment Corporation ("DEC"), Compaq Computer Corporation ("Compaq") (Alpha), IBM (RS/6000), Hewlett-Packard Company ("HP") (HP9000), and SGI (formerly "Silicon Graphics, Inc."). Additionally, local devices may communicate with remote computers via a variety of protocols including, but not limited to, USB, American Standard Code for Information Interchange ("ASCII"), and Recommend Standard-232 ("RS-232").

A variety of cabling mechanisms may be used to connect the user workstations and the remote computers to the computer management system of the present invention. The preferred embodiment of the present invention incorporates a single Category 5 Universal Twisted Pair ("CAT 5") cable to connect each remote computer and each user workstation to the computer management system. However, other cabling may be used without departing from the spirit of the present invention.

To achieve the desired administration efficiency while reducing costs and promoting space conservation, the present invention provides a system with reduced cabling requirements. In addition, the architecture of the present invention is designed to minimize the quantity of peripheral devices associated with each remote computer. Further, it is an object of the present invention to allow audio generated internal to or external to a remote computer to be played at near CD quality at a user workstation.

Therefore, it is an object of the present invention to allow a remote computer's auxiliary peripheral devices to be accessed and controlled by a local user workstation.

It is also an object of the present invention to allow bi-directional communication of the auxiliary peripheral device signals between the user workstation and one or more remote computers.

It is yet another object of the present invention to allow audio generated at a user workstation to be played at near CD quality at a remote computer.

Also, it is an object of the present invention to provide an improved, modular computer management system that is reliable while minimizing the quantity of expensive and space-consuming peripheral devices required to access and operate multiple remote computers.

Further, it is an object of the present invention to provide a modular computer management system that allows one or more sets of peripheral devices to access and operate one or more remote computers as if the local peripheral devices were directly connected to the remote computers.

Furthermore, it is an object of the present invention to allow information technology ("IT") personnel to easily manage a volume of servers for both small-scale computer centers and large-scale computer centers such as data-centers, server-farms, web-hosting facilities, and call-centers.

Also, it is an object of the present invention to allow IT personnel to easily communicate with each other when managing two distinct computers separated by an extended distance.

It is a further object of the present invention to provide a modular computer management system that is easy to install and operate.

In addition, it is an object of the present invention to provide a modular computer management system that is relatively small in size, thereby minimizing the space required to house the computers, peripheral devices and the computer management system.

Furthermore, it is an object of the present invention to provide a computer management system that allows high resolution video to be displayed at an extended distance from the computer at which the video signals originate.

Further, it is an object of present invention to provide a modular computer management system, which allows error-free communications between peripheral devices of a user workstation and computers located at an extended distance from the user workstation.

It is also an object of the present invention to provide a modular computer management system that provides enhanced tuning to amplify and condition video signals after transmission over an extended range.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment and alternate embodiments set forth in the illustrations of the accompanying drawings. Although the illustrated embodiments are merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, detailed illustrative embodiments of the present invention are disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 1:
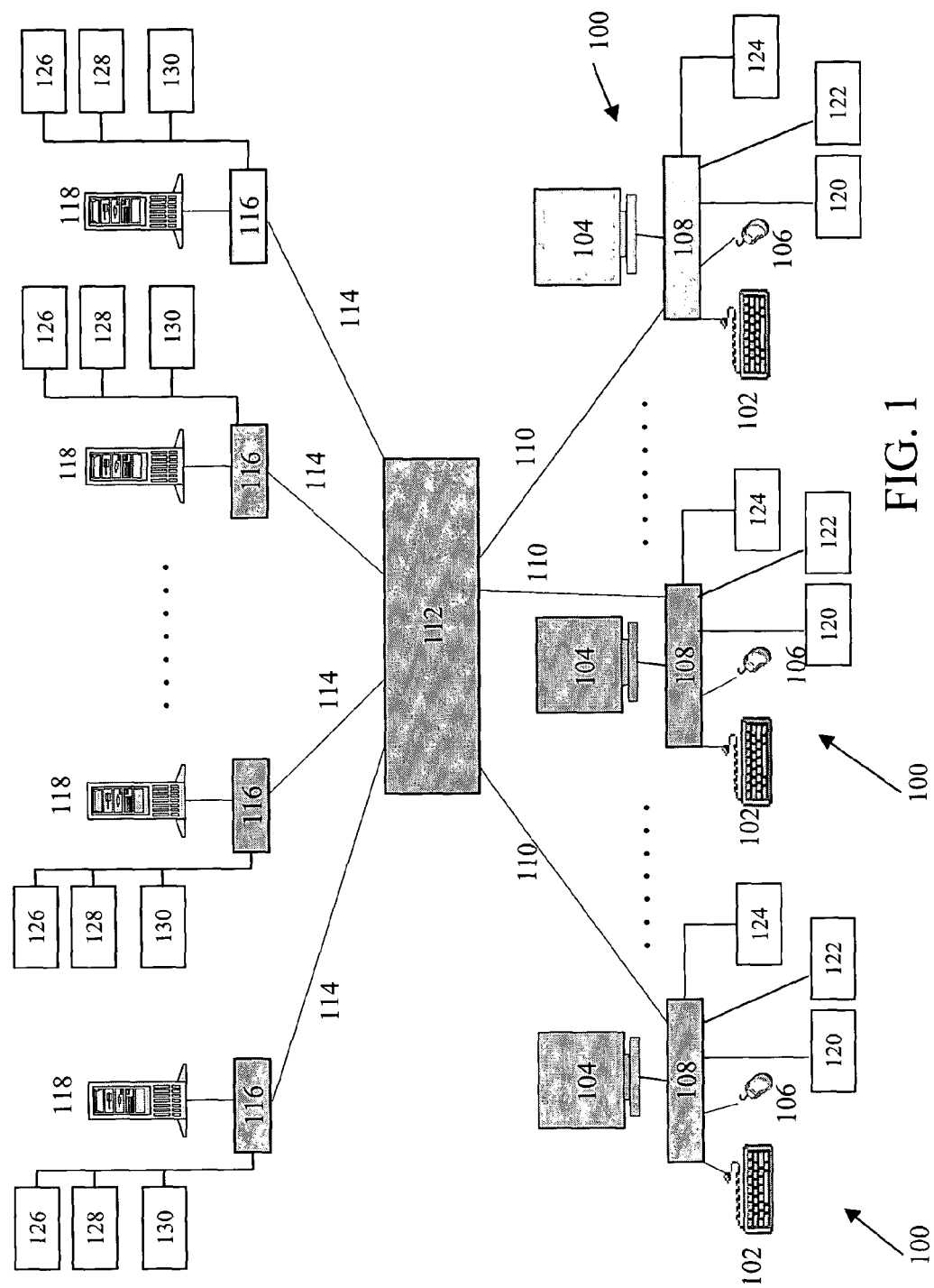
FIG. 1 is a schematic representation of the remote computer management system according to the preferred embodiment of the present invention illustrating the connection of multimedia user workstations and multiple remote computers to one Matrix Switching Unit ("MSU") via CAT 5 cables.

Referring first to FIG. 1, depicted is the architecture of the preferred embodiment of the present invention. Specifically, a modular, intelligent, computer management system is shown including a centrally located MSU 112, multimedia user workstations 100, multimedia CIMs 116, CIM audio output devices 126, CIM audio input devices 128, CIM I/O modules 130, and remote computers 118. Each multimedia user workstation 100 comprises multimedia UST 108, keyboard 102, video monitor 104, cursor control device 106, UST audio output device 120, UST audio input device 122, and UST I/O module 124. Furthermore, each multimedia UST 108 and multimedia CIM 116 is connected to MSU 112 via cables 110 and 114, respectively. Although the computer management system is discussed herein with respect to the multimedia embodiment of the present invention, it should be noted that the present invention is also capable of operating with non-multimedia USTs and non-multimedia CIMs.

Although single CAT 5 cabling is the preferred cabling for use with the present invention, other cabling may be used, such as coaxial, fiber optic, or multiple CAT 5 cables, depending on the specific needs of the system user. CAT 5 cabling is preferred because it reduces cabling costs while maintaining the strength of the signals that are transmitted over extended distances. Additionally, the use of single CAT 5 cabling minimizes the space required to house the computer system and its associated wiring.

Individual CAT 5 cables may be used for connection of each multimedia UST 108 and each multimedia CIM 116 to MSU 112. Conventional CAT 5 cables include four (4) twisted pair of wires. The present invention utilizes three (3) of these twisted pair for the transmission of video signals. Each of the three (3) twisted pair transmits one of the three video color signals (i.e., red, green or blue). To allow all video signals to be transmitted via only (3) twisted pair, the horizontal and vertical synchronization signals, which would otherwise require their own twisted pairs, are individually encoded on one of the red, green, or blue video signals. That is, each synchronization signal is encoded on its own, dedicated color signal. For example, the vertical synchronization signal may be encoded on the blue video signal while the horizontal synchronization signal may be encoded on the green video signal. All other non-video signals such as keyboard, cursor control device, and audio signals, are transmitted via the fourth twisted pair cable.

The single CAT 5 cables are connected to multimedia UST 108, MSU 112, and multimedia CIM 116 by plugging each end into a RJ-45 connector located on these respective components. Although RJ-45 connectors are preferred, other types of connectors may be used, including but not limited to RJ-11, RG-58, RG-59, British Naval Connector ("BNC"), and ST connectors.

UST audio output device 120 and CIM audio output device 126 of the present invention may be any device that is capable of receiving audio signals. For example, UST audio output device 120 and CIM audio output device 126 may be the audio in port of remote computer 118, a speaker, an analog recording device, a digital recording device, an audio-equipped projector, an audio-equipped camcorder, an audio-equipped camera, a television, a telephone, a cellular telephone, a computer distinct from remote computer 118, etc. Similarly, UST audio input device 122 and CIM audio input device 128 may be any device that is capable of generating or transmitting audio signals. For example, UST audio input device 122 and CIM audio input device 128 may be the audio out port of remote computer 118, a microphone, an analog playback device, a digital playback device, an audio-equipped projector, an audio-equipped camcorder, an audio-equipped camera, a telephone, a cellular telephone, a television, a Videocassette Recorder ("VCR"), a DVD player, a CD-player, a computer distinct from remote computer 118, etc.

UST I/O module 124 and CIM I/O module 130 of the present invention are used to connect auxiliary peripheral devices to the multimedia UST 108 and multimedia CIM 116, respectively. UST I/O module 124 and CIM I/O module 130 may contain one or more ports of varying types for connection of auxiliary peripheral devices. The types of ports include, but are not limited to, Universal Serial Bus ("USB"), Recommended Standard 232 ("RS-232"), PS/2, Registered Jack 11 ("RJ-11"), Registered Jack 31 ("RJ-31"), Registered Jack 45 ("RJ-45"), Registered Jack 48 ("RJ-48"), British Naval Connector ("BNC"), Centronics, Advanced Technology ("AT"), SuperVideo ("S-Video"), Digital Video Interface ("DVI"), Integrated Development Environment ("IDE"), Fiber Distributed Data Interface ("FDDI"), Small Computer System Interface ("SCSI"), and switch contact.

Various types of auxiliary peripheral devices may be connected to UST I/O module 124 and CIM I/O module 130. Some examples of auxiliary peripheral devices include, but are not limited to, a keyboard, a cursor control device, an optical cursor control device, a trackball, a USB keyboard/cursor control device adapter, a port expander, a Bluetooth device, a cellular telephone, a web camera, a floppy disk drive, a hard disk drive, a USB Flash Drive, a digital media reader/writer, a microphone, a speaker, a subwoofer, a scanner, a copier, a printer, a projector, a television, an analog monitor, a digital monitor, a video capture device, a modem, a hub, a router, a switch, a cable modem, a DSL modem, a wireless network hub, a wireless network router, a wireless access point, a print server, a wireless print server, an Ethernet adapter, an analog audio playback device, an analog audio recording device, a digital audio playback device, a digital audio recording device, a tape drive, a storage backup device, a joystick, a game pad, a power supply, an uninterruptible power supply ("UPS"), a USB hub, a CD-ROM device, a CD-RW device, a DVD-ROM device, a DVD-RAM device, a camera, a camcorder, a fingerprint reader, a retina scanner, and a biometric authentication device.

Each auxiliary peripheral device may either be coupled to multimedia UST 108 via UST I/O module 124 or to multimedia CIM 116 via CIM I/O module 130. For example, a CD-ROM device may be attached to a multimedia UST 108 to allow a system administrator to perform software upgrades. The system administrator can then access and upgrade each remote computer utilizing the CD-ROM device attached to the system administrator's multimedia UST 108. As another example, a tape drive may be attached to a multimedia UST 108 to allow a system administrator to backup multiple computers from the same multimedia user workstation 100 utilizing a single tape drive.

Additionally, auxiliary peripheral devices may be used for security purposes. For example, a fingerprint reader may be attached to a multimedia user workstation 100 to read the identity of the individual attempting to operate it. The system may be programmed to only allow a system administrator to access and operate remote computer 118 upon fingerprint authentication by the respective remote computer 118. In this manner, user access to each remote computer 118 may be controlled by verifying the identity of the user.

Similarly, any of the aforementioned auxiliary peripheral devices may be attached to multimedia CIM 116. For example, a microphone may be attached to multimedia CIM 116 to allow voice communication between a person located at multimedia CIM 116 and a person located at multimedia user workstation 100. This capability greatly enhances the system administration of remote computers 118 by allowing a system administrator located at multimedia CIM 116 to more effectively communicate with another system administrator located at multimedia user workstation 100.

The aforementioned examples are for illustrative purposes only and are not intended to define all of the embodiments of the present invention. Many other combinations of auxiliary peripheral devices are possible without departing from the spirit of the present invention.

Each multimedia user workstation 100 of the intelligent, modular computer management system of the present invention receive signals from attached keyboard 102, cursor control device 106, UST audio output device 120, UST audio input device 122, and UST I/O module 124. The signals received at multimedia UST 108 are packetized (i.e., converted to one or more data packets), as discussed in greater detail below, and transmitted to MSU 112 via single cable 110. In the preferred embodiment, the data packets are also encoded utilizing Manchester code. Manchester code is a standard code used to transmit data in which data and clock signals are combined to form a single self-synchronizing data stream. Manchester encoding guarantees that there are transitions in the signal for every bit transmitted, thus allowing for better data recovery in long length cables. At MSU 112, the packetized signals are processed to create new data packets, which are transmitted to multimedia CIM 116 via cable 114. Multimedia CIM 116 then processes the received data packets and emulates keyboard and cursor control device signals to the corresponding ports of remote computer 118. Additionally, multimedia CIM 116 is capable of emulating audio to CIM audio output device 126 or auxiliary peripheral device signals to CIM I/O module 130.

Conversely, multimedia CIM 116 receives signals from attached remote computer 118, CIM audio input device 128, and CIM I/O module 130. Specifically, the signals received from remote computer 118 include keyboard, video, and cursor control device signals. Multimedia CIM 116 then packetizes the received keyboard, cursor control device, audio, and auxiliary peripheral device signals and transmits the generated data packets along with the video signals, as discussed in greater detail below, to MSU 112 via cable 114. At MSU 112, the data packets are processed and new data packets are generated and transmitted along with the video signals to multimedia UST 108 via single cable 110. Multimedia UST 108 then applies the received video signals to attached video monitor 104 and emulates keyboard and cursor control device signals to keyboard 102 and cursor control device 106, respectively. Also, multimedia UST 108 is capable of emulating audio to attached UST audio output device 120 and emulating auxiliary peripheral device signals to UST I/O module 124.

The computer management system of the present invention allows a system user to select a remote computer 118 even if it is not powered. This novel feature allows a system user to select the unpowered remote computer 118, apply power to it, and thereafter view its boot up sequence. Viewing the boot up sequence allows a system user to view all BIOS (i.e., a set of routines stored in the PC that provides an interface between the PC hardware and its operating system) activity occurring from the time at which power is applied.

Furthermore, for simplicity, FIG. 1 depicts an embodiment of the computer management system of the present invention that connects eight (8) multimedia USTs 108 and thirty-two (32) multimedia CIMs 116 to one MSU 112. However, the computer management system of the present invention may comprise more than one MSU 112. For example, multiple MSUs 112 may be configured in a tiered or hub configuration to connect a virtually unlimited quantity of multimedia user workstations 100 with a virtually unlimited quantity of remote computers 118 while still achieving optimal results. Two alternate configurations are discussed in greater detail below with respect to FIGS. 7 and 8.

Selection of remote computer 118 from multimedia user workstation 100 may be accomplished using a variety of methods. One such method is choosing remote computer 118 from a list displayed at video monitor 104. This list is generated by a menu circuit embedded within the computer management system. The menu circuit generates a display on video monitor 104 to facilitate system programming and provide information that is useful for system operation. Furthermore, multiple security features such as passwords, system user histories, etc. may be implemented and operated in conjunction with the menu circuit and its generated display.

The list generated by the computer management system of the present invention includes a "drill down" feature. In other words, the computer management system may be configured to allow a system user to select a short list of remote computers 118 based upon specific criteria (e.g., the function performed by the computer, the server rack or server room in which the computer is located, the floor of the building on which the computer is located, etc.) in lieu of scrolling through a list of all connected remote computers 118. Since the computer management system of the present invention may connect a virtually unlimited quantity of remote computers, this feature helps a system user to quickly locate a single computer.

Figure 2A:
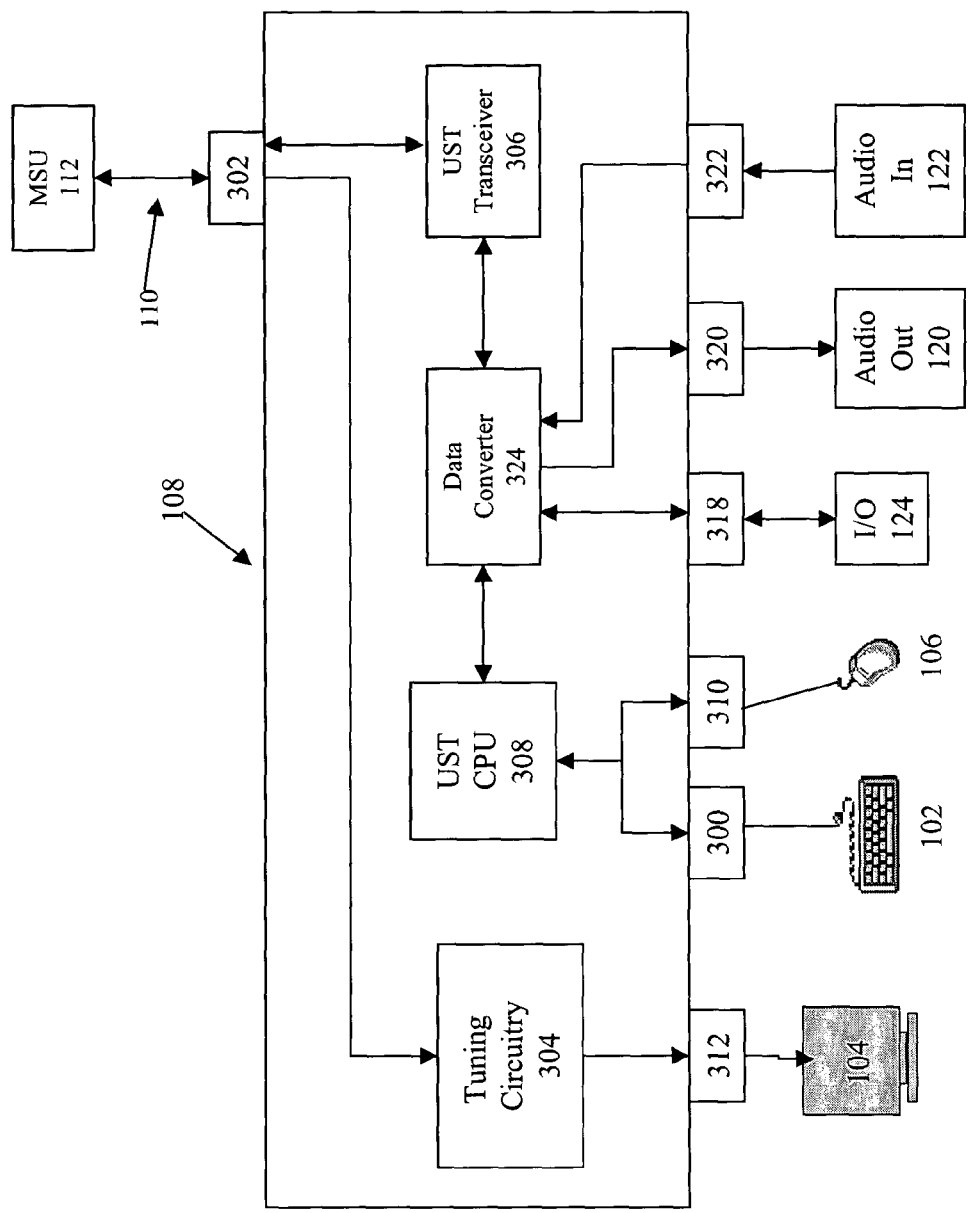
FIG. 2A is a schematic representation is a schematic representation of the preferred embodiment of the internal structure of the multimedia UST shown in FIG. 1, including the attached peripheral devices.

Turning next to FIG. 2A, depicted is a schematic diagram of the preferred internal structure of multimedia UST 108 according to the present invention. Multimedia UST 108 interfaces the components of multimedia user workstation 100 (i.e., keyboard 102, video monitor 104, cursor control device 106, UST I/O module 124, UST audio output device 120, and UST audio input device 122) for use with the computer management system of the present invention. Keyboard 102, video monitor 104, cursor control device 106, UST audio output device 120, and UST audio input device 122 are connected to keyboard port 300, video port 312, cursor control device port 310, UST audio out port 320, and UST audio in port 322 of multimedia UST 108, respectively, using industry standard keyboard, video, cursor control device, and audio cabling. In the preferred embodiment of the present invention, UST I/O module 124 is connected to UST I/O port 318 via a 40-pin ribbon cable. However, it will be apparent to one of skill in the art that multimedia UST 108 and UST I/O module 124 can be designed to utilize any type of cable for coupling multimedia UST 108 to UST I/O module 124 including, but not limited to, coaxial cable, fiber optic cable, CAT 1 cable, CAT 2 cable, CAT 3 cable, CAT 4 cable, CAT 5 cable, CAT 5e cable, CAT 6 cable, and CAT 7 cable. Furthermore, UST I/O module 124 may be a standalone device or may be internal to multimedia UST 108.

UST CPU 308 receives signals from keyboard 102 and cursor control device 106 via keyboard port 300 and cursor control device port 310, respectively. Thereafter, UST CPU 308 transmits information to UST transceiver 306 via data converter 324 to allow the information to be included in a data packet to be created by UST transceiver 306.

Simultaneously, data converter 324 receives signals from UST I/O module 124 and UST audio input device 122 via UST I/O port 318 and UST audio in port 322, respectively. Additionally, signals relating to the keyboard and cursor control device information are received from UST CPU 308 for inclusion in the data packet. UST transceiver 306 combines the received keyboard signals, cursor control device signals, audio signals, I/O module signals, and administrative signals to create data packets.

Figure 2B:
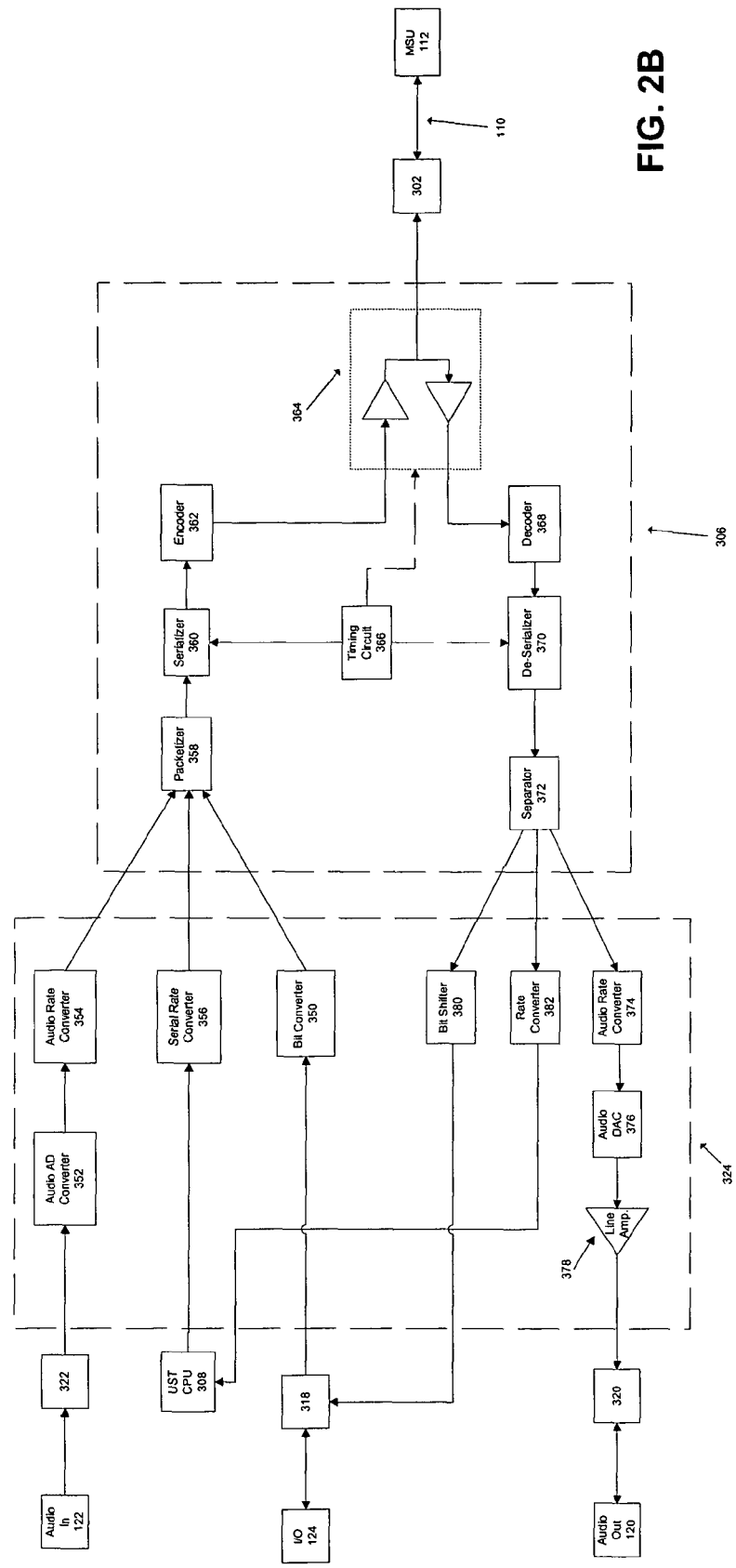
FIG. 2B is a detailed schematic diagram of the preferred embodiment of the UST transceiver and data converter located within the multimedia UST of FIG. 2A.

As shown in FIG. 2B, which depicts a schematic diagram of UST transceiver 306 and data converter 324, the UST I/O module signals are received from UST I/O module 124 via UST I/O port 318 and are input to bit converter 350 located in data converter 324. Bit converter 350 translates UST I/O module signals into a parallel data format. Similarly, the audio signals are received from UST audio input device 122 via UST audio in port 322 and are converted to digital signals by analog-digital converter ("AD converter") 352. The digitized audio signals are then input to audio rate converter 354 which formats the rate of data flow. Additionally, signals relating to the keyboard and cursor control device information are received from UST CPU 308 and are input to serial rate converter 356 which converts the keyboard and cursor control device signals to a serial format.

UST transceiver 306 combines the signals received from audio rate converter 354, serial rate converter 356, and bit converter 350 to create data packets in packetizer 358, as discussed in further detail below with respect to FIG. 5. It should be noted that the I/O module signals typically contain the same information as the auxiliary peripheral device signals mentioned above. The reason for this is that UST I/O module 124 and CIM I/O module 130 are used to interface auxiliary peripheral devices to multimedia UST 108 and multimedia CIM 116, respectively. In addition, the data packet contains overhead data, also discussed in more detail below for FIG. 5. Thereafter, UST transceiver 306 converts the data packets to a serial format utilizing serializer 360 and encodes the data packet utilizing encoder 362. Signal converter 364 then conditions the data packet for transmission over a single CAT 5 cable by converting the data packet to a differential signal for transmission over a single twisted pair located in the CAT 5 cable and by applying the proper network protocol to the data packet. The data packet is then transmitted to port 302 for transmission to MSU 112 via cable 110. Timing circuit 366 directs serializer 360 and signal converter 364 to create and transmit a new data packet every twenty (20) microseconds to ensure constant data flow.

Keyboard, cursor control device, I/O module, and audio signals in the form of a data packet are received from MSU 112 via cable 110 at port 302. Signal converter 364 located in UST transceiver 306 converts the data packet from a differential form to its original form and removes network protocol conditioning performed by MSU 112. Next, the data packet is decoded by decoder 368 and de-serialized by de-serializer

370. Timing circuit 366 instructs de-serializer 370 to de-serialize a data packet every twenty (20) microseconds to ensure constant data packet flow. The data packet is then processed by separator 372 which parses the data packet into its original components.

The received audio signals are processed by audio rate converter 374 located in data converter 324. Audio rate converter 374 synchronizes and converts the received data rate to precisely timed data required by audio digital-to-analog converter 376. The digital audio signals are then converted to analog signals in audio digital-to-analog converter ("DAC converter") 376 and undergo signal amplification by signal amplifier 378. The amplified analog audio signals are then applied to UST audio out port 320.

The received I/O module signals are conditioned by bit shifter 380 which converts the I/O module signals from a parallel format to their original format. The I/O module signals are then transmitted to UST I/O module 124 via UST I/O module port 318. The keyboard and cursor control device signals are processed by rate converter 382 and passed through data converter 324 to UST CPU 308, which uses the information contained in the signals to emulate keyboard and cursor control device signals. These emulated signals are applied to keyboard 102 and cursor control device 106 via keyboard port 300 and cursor control device port 310, respectively (FIG. 2A).

Figure 5:
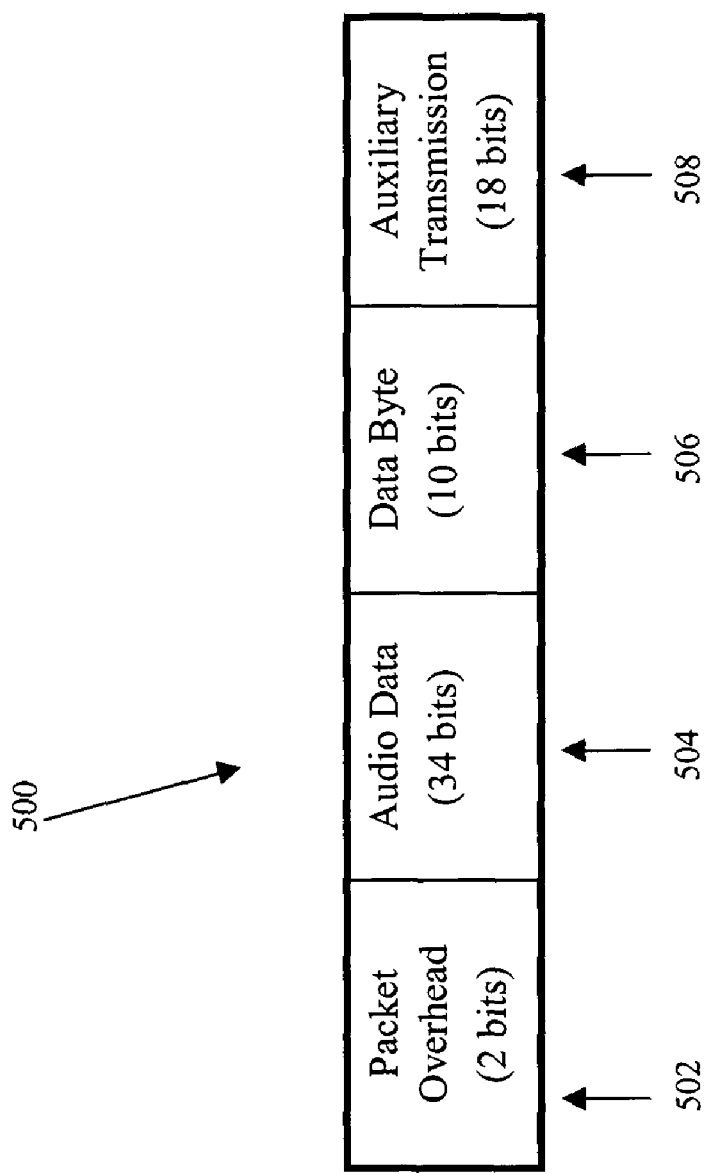
FIG. 5 is a schematic representation of a data packet used to transmit data in the remote computer management system according to the preferred embodiment of the present invention.

Referring to FIG. 5, provided is an example of a data packet used to transmit keyboard, cursor control device, audio, and auxiliary peripheral device signals in accordance with the preferred embodiment. The system of the present invention utilizes the same data packet structure to transmit keyboard signals, cursor control device signals, audio signals, and auxiliary peripheral device signals from multimedia CIM 116 to multimedia UST 108 and vice versa. The preferred embodiment of data packet 500 consists of sixty-four (64) bits. First section 502 comprises two bits that contain instructional data (i.e., command data) and data regarding the total length of data packet 500.

Second section 504 of data packet 500 comprises thirty-four (34) bits and is dedicated to the transmission of audio data. Sixteen (16) bits are utilized for the left stereo audio channel and sixteen (16) bits are utilized for the right stereo audio channel. The remaining two bits of second section 504 are checksum bits that are used to ensure that the audio data is transmitted without error.

Third section 506 of data packet 500 comprises ten (10) bits and is dedicated to the transmission of keyboard, cursor control device, and administrative information including characters typed on keyboard 102 or clicks performed with cursor control device 106 (FIG. 1). Eight (8) of the ten (10) bits are utilized to transmit the keyboard, cursor control device, and administrative information, one bit is used as a parity bit for use in a parity check, and the final bit is utilized as a control bit. The control bit is used to signal if data is present in the data packet. The control bit is additionally utilized to select if the data packet is transmitted to MSU CPU 212.

Fourth section 508 of data packet 500 comprises the remaining eighteen bits of data packet 500 and is utilized to transmit auxiliary peripheral device signals such as those received from CIM I/O module 130 or UST I/O module 124.

Multimedia UST 108 continuously transmits one data packet 500 approximately every twenty five (25) microseconds, even if multimedia UST 108 is not connected to the computer management system. Additionally, for simplicity, there is no packet acknowledge. That is, multimedia UST 108 and multimedia CIM 116 do not transmit an acknowledgement signal to multimedia CIM 116 or multimedia UST 108, respectively, to acknowledge that a data packet has been received.

As each data packet 500 is received at MSU 112, it is received and processed and, thereafter, a new data packet 500 is created, as discussed above with respect to FIG. 2A. During processing of data packet 500, MSU 112 creates a new third section 506 of data packet 500. The remainder of data packet 500 (i.e., first section 502, second section 504, and fourth section 508) is passed through MSU 112 without change.

Similarly, keyboard, cursor control device, I/O module, and audio signals received from MSU 112 via cable 110 (FIG. 1) are received via port 302. UST transceiver 306 receives, de-serializes, and transmits these signals to data converter 324. The received audio signals are converted to analog signals and are applied to UST audio output device 120 via UST audio out port 320. The received I/O module signals are converted and transmitted TO UST I/O module 124 via UST I/O module port 318. The keyboard and cursor control device signals are passed unprocessed through data converter 324 to UST CPU 308, which uses the information contained in the signals to emulate keyboard and cursor control device signals to keyboard 102 and cursor control device 106 via keyboard port 300 and cursor control device port 310, respectively.

UST CPU 308 of the present invention is programmed to automatically create keyboard and cursor control device signals that are compatible with the communication protocol of the connected keyboard 102 and cursor control device 106, even though the original keyboard and cursor control device signals generated at the remote computer 118 (FIG. 1) may not be compatible with the communication protocol of keyboard 102 and cursor control device 106. That is, the keyboard and cursor control device signals are not simply transmitted from keyboard 102 and cursor control device 106 to the respective ports of remote computer 118 and vice versa. Rather, information regarding the entered signals is transmitted between UST CPU 308 and CIM CPU 406 (FIG. 4A), and these CPUs intelligently emulate the keyboard and cursor control device signals in a format that will be understood by the equipment receiving the signals (i.e., keyboard 102, cursor control device 106, or remote computer 118). This novel feature allows any type of computer to be connected to the computer management system of the present invention. Furthermore, this feature allows the computer management system to provide compatibility between computers and auxiliary peripheral devices that otherwise would not be compatible.

Figure 2C:
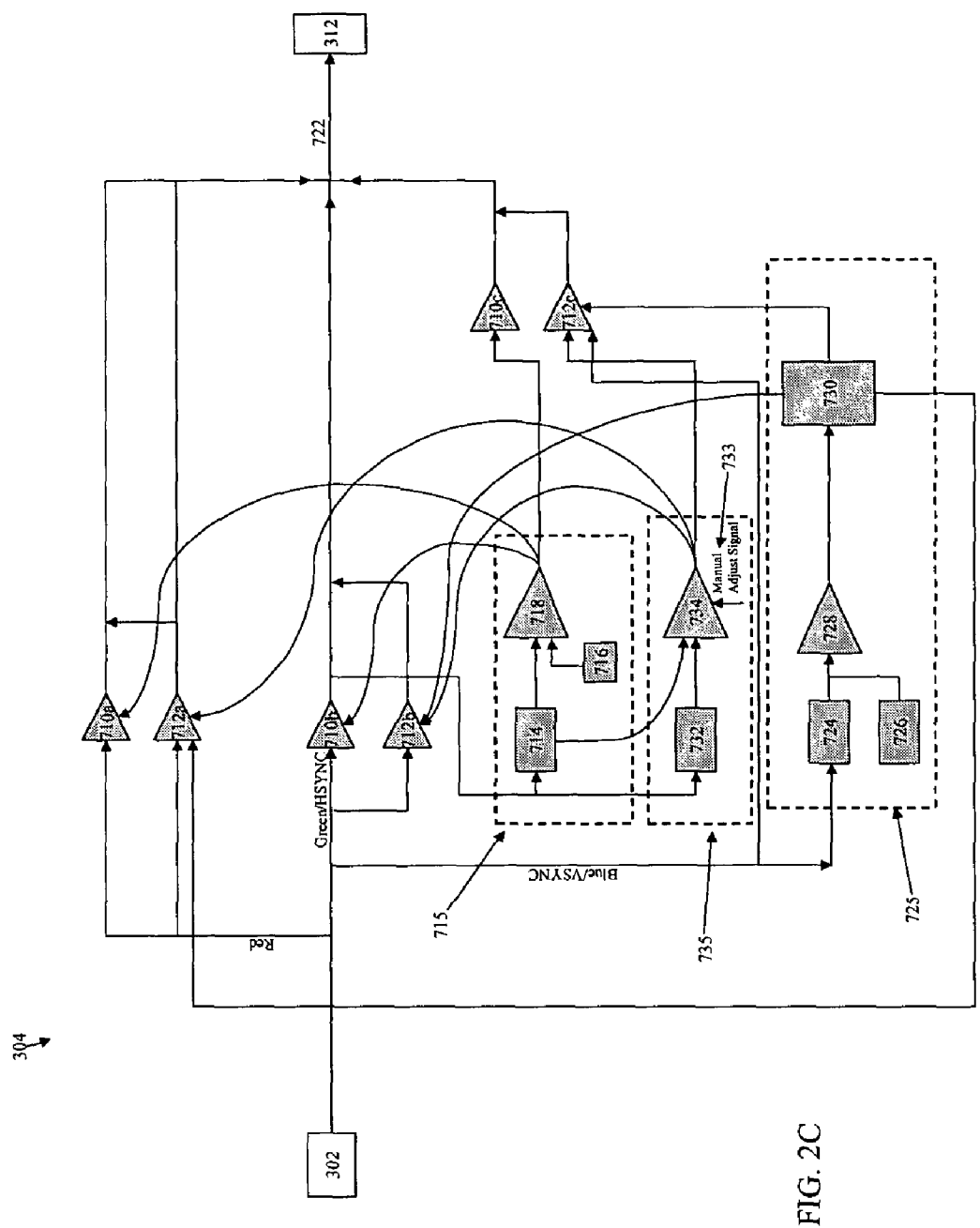
FIG. 2C is a schematic representation of the preferred embodiment of the tuning circuit shown in FIG. 2A, which compensates for the amplitude and frequency reduction that occurs during video signal transmission.

Unidirectional video signals are also received at port 302 from MSU 112 via cable 110 (FIG. 1). However, because the amplitudes of the transmitted signals are greatly reduced and the frequencies of the signals are attenuated, the video signals are not transmitted to UST transceiver 306, but rather are transmitted to tuning circuitry 304 that conditions the video signals. FIG. 2C depicts a schematic representation of tuning circuitry 304. Tuning circuitry 304 preferably comprises red variable gain amplifier 710a, green variable gain amplifier 710b, blue variable gain amplifier 710c, red frequency compensation amplifier 712a, green frequency compensation amplifier 712b, blue frequency compensation amplifier 712c, slow peak detector 714, voltage source 716, comparator 718, slow peak detector 724, voltage source 726, comparator 728, video switch 730, fast peak detector 732, and comparator 734.

During operation, the keyboard, video, and cursor control device signals from remote computer 118 are transmitted via cable 418 to CIM 116 (FIGS. 1 and 4). Thereafter, the video signals and data packets generated by CIM CPU 406 are transmitted from CIM 116 to MSU 112 via CAT 5 cable 114

(FIGS. 1 and 4). At this point in the video signal transmission, the amplitudes of the transmitted video signal may be greatly reduced and the frequencies of the video signal may be attenuated. Subsequently, the video signal and the signals generated by MSU CPU 212 are transmitted from MSU 112 to UST 108, wherein the video signal is conditioned by tuning circuitry 304.

As previously discussed, the video signal is degraded during transmission over an extended range. Specifically, the amplitudes of the video signals are reduced and the frequencies of the video signals are greatly attenuated. Therefore, tuning circuitry 304 is implemented to automatically tune the received signals to achieve the desired amplitude and frequency.

In the preferred embodiment, the horizontal synchronization signal is encoded on and transmitted with the green video signal, and the vertical synchronization signal is encoded on and transmitted with the blue video signal. However, it is known to one of ordinary skill in the art that the horizontal and vertical synchronization signals may be encoded on and transmitted with any one of the red, green, or blue video signals. Preferably, the horizontal and vertical synchronization signals are encoded as negative pulses, since the video signals (i.e., red, green, and blue) are typically positive pulses.

Tuning circuitry 304, as depicted in FIG. 2C, contains three dedicated signal conditioning circuits (i.e., one for each of the red, blue, and green video color signals), a gain amplification adjustment circuit 715, a frequency compensation amplification adjustment circuit 735, and an additional filtering enablement circuit 725.

In operation, the red component of the video signal is initially transmitted to red variable gain amplifier 710a and red variable frequency compensation amplifier 712a. Preferably, red variable gain amplifier 710a adjusts the amplitude of the red component of the video signal based upon the output of gain amplification adjustment circuit 715. Concurrently, red variable frequency compensation amplifier 712a adjusts the frequency of the red component of the video signal based upon the output of frequency compensation amplification adjustment circuit 735. The outputs of red variable gain amplification circuit 710a and red frequency compensation circuit 712a are electrically combined and transmitted via wire 722 to video port 312 for transmission to video monitor 104.

The green component of the video signal, with the encoded horizontal synchronization signal, is initially transmitted to green variable gain amplifier 710b and green variable frequency compensation amplifier 712b. The two outputs are then electrically combined and transmitted to gain amplification adjustment circuit 715 and frequency compensation amplification adjustment circuit 735. Gain amplification circuit 715 comprises slow peak detector 714 that receives the electrically combined outputs of green variable gain amplifier 710b and green variable frequency compensation amplifier 712b. Slow peak detector 714 detects the amplitude of the horizontal synchronization signal, which is encoded on the green component of the video signal, and transmits a signal representing this amplitude to comparator 718 and comparator 734. Comparator 718 then compares the signal received from slow peak detector 714 to a constant reference voltage supplied by voltage source 716. The signal supplied by voltage source 716 represents the desired amplitude for the horizontal synchronization signal. Next, comparator 718 transmits a signal to red variable gain amplifier 710a, green variable gain amplifier 710b, and blue variable gain amplifier 710c to adjust the level of amplification of the red, green, and blue components of the video signal until the desired amplitude is achieved.

Similarly, green variable frequency compensation amplifier 712b adjusts the level of amplification of the frequency of the horizontal synchronization signal based upon the output of frequency compensation amplification adjustment circuit 735. Frequency compensation amplification adjustment circuit 735 comprises fast peak detector 732 that also receives the electrically combined outputs of green variable gain amplifier 710b and green variable frequency compensation amplifier 712b. Fast peak detector 732 detects the rising edge of the horizontal synchronization signal and transmits a signal representing this rising edge to comparator 734. Then, comparator 734 compares the signal received from fast peak detector 732 to the output of slow peak detector 714 to compare the amplitude of the rising edge of the horizontal synchronization signal pulse to the amplitude of the horizontal synchronization signal pulse itself. Next, comparator 734 sends a signal that is fed to red variable frequency compensation amplifier 712a, green variable frequency compensation amplifier 712b, and blue variable frequency compensation amplifier 712c to adjust the level of amplification of the red, green, and blue components of the video signal until the desired frequency is achieved. optionally, the signal transmitted by comparator 734 may be manually adjusted using manual input 733 by a system user (e.g., via the menu displayed on the video monitor). Such a feature would allow the system user to manually "tweak" the gain of the video signals until a desired video output is achieved.

The blue component of the video signal, along with the encoded vertical synchronization signal, is initially transmitted to blue variable gain amplification circuit 710c, blue variable frequency compensation circuit 712c, and filtering enablement circuit 725, which is employed to increase the range of red variable frequency compensation amplifier 712a, green variable frequency compensation amplifier 712b, and blue variable frequency compensation amplifier 712c when the video signals have been transmitted over approximately four hundred fifty (450) feet. The vertical synchronization signal, which is encoded on the blue component of the video signal as a precise square wave signal of known duration and amplitude, is used as a precise reference point for filtering enablement circuit 725. The blue component of the video signal and the encoded vertical synchronization signal are received by slow peak detector 724, which detects the amplitude of the vertical synchronization signal. Slow peak detector 724 transmits a signal representing the amplitude of the vertical synchronization signal to comparator 728, which compares it to the known amplitude of a similar signal transmitted for four hundred fifty (450) feet. This known amplitude is represented by a constant reference voltage applied to comparator 728 by voltage source 726. If comparator 728 determines that the vertical synchronization signal (and therefore all of the video signals) have been transmitted over four hundred fifty (450) feet, a signal indicating this is transmitted to video switch 730. Video switch 730 then sends a signal to red variable frequency compensation amplifier 712a, green variable frequency compensation amplifier 712b, and blue variable frequency compensation amplifier 712c to increase the range of each frequency compensation amplifier 712a, 712b, and 712c. Subsequent to gain amplification by gain amplification adjustment circuit 715 and frequency compensation by frequency compensation amplification adjustment circuit 735, the conditioned red, green, and blue components of the video signal are transmitted to video monitor 104 of the local user workstation via wire 722 and video port 312.

Figure 3A:
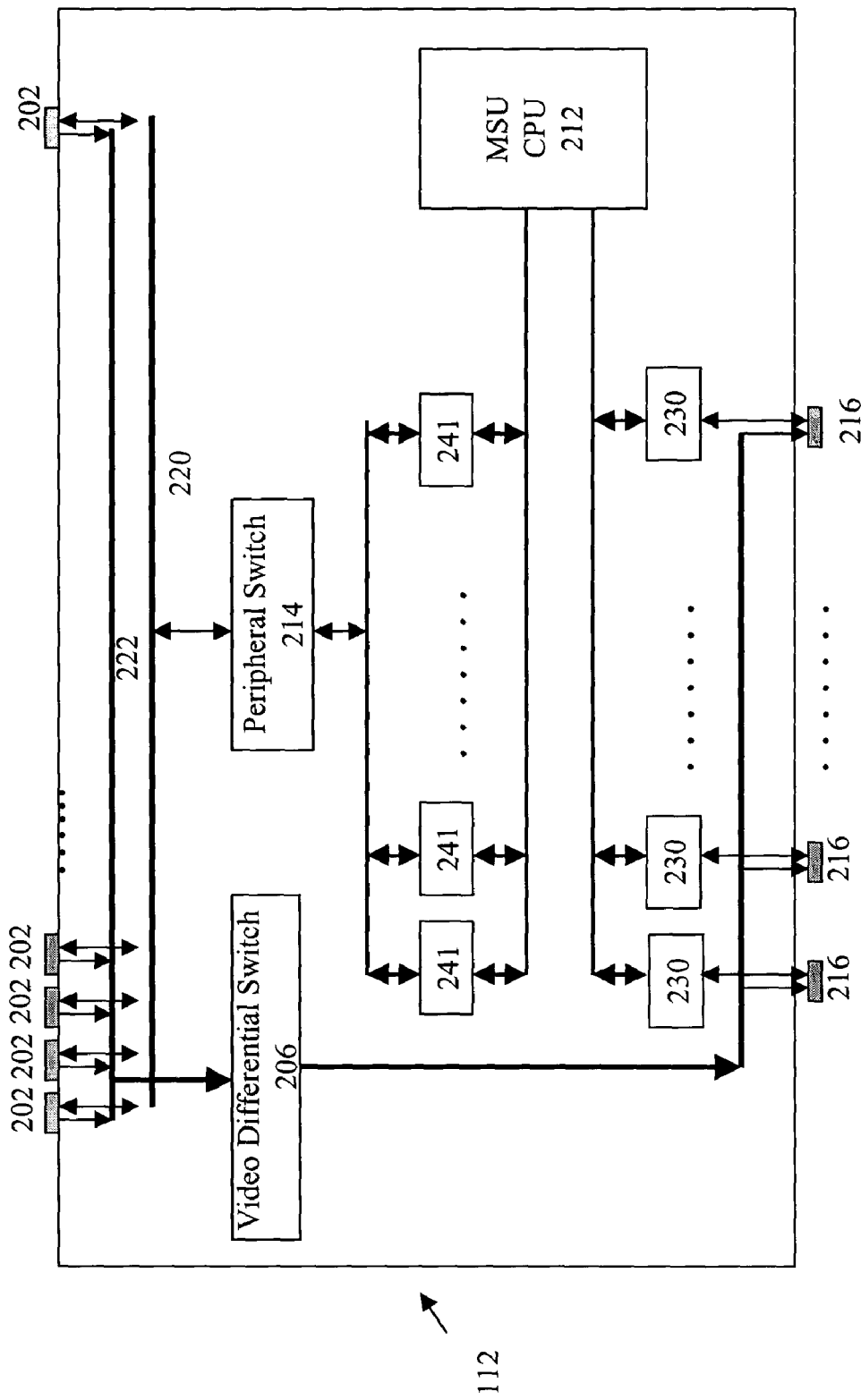
FIG. 3A is a schematic representation of the MSU shown in FIG. 1 according to the preferred embodiment of the present invention illustrating a block diagram of the internal structure of the MSU and electrical connectors for CAT 5 cables.

Turning next to FIG. 3A, depicted is a schematic representation of MSU 112, which enables multiple users operating multimedia user workstations 100 to access and operate multiple remote computers 118. In the preferred embodiment of the present invention, access to remote computer 118 from multimedia user workstation 100 is performed solely via one or more MSUs 112, independent of any network that may couple the remote computers 118 to each other such as a LAN, WAN, etc. In other words, the preferred embodiment of the computer management system of the present invention does not use an existing computer network to allow a multimedia user workstation 100 to access and control remote computers 118. Rather, all physical connections between multimedia user workstation 100 and remote computer 118 occur through one or more MSUs 112.

In the preferred embodiment of the present invention, each port 202 is an RJ-45 socket that allows one multimedia CIM 116 to be connected to its own, dedicated port 202 via cable 114 (FIG. 1). The uni-directionally transmitted (i.e., from remote computer 118 to multimedia user workstation 100 only) video signals are received at MSU 112 via port 202 onto video bus 222, whereupon these signals are transmitted to video differential switch 206. Video differential switch 206 is capable of routing any video signal received from video bus 222 to any port 216. Therefore, video differential switch 206 transmits the video signals to the specific port 216 that is connected to the desired multimedia UST 108 via single cable 110 (FIG. 1). Multimedia UST 108 then applies the received video signals to video monitor 104.

In addition to routing the unidirectional video signals, MSU 112 also bi-directionally transmits keyboard, cursor control device, administrative, audio and auxiliary peripheral device signals between multimedia USTs 108 and multimedia CIMs 116. Administrative signals are signals created internal to the computer management system of the present invention based upon the input of a system administrator or a system programmer. In the preferred embodiment of the present invention, such input is provided via keyboard 102 and cursor control device 106 of multimedia user workstation 100 in response to a menu displayed on video monitor 104. One such administrative feature allows a system administrator to designate one or more remote computers 118 as blocked (i.e., only the system administrator may access the remote computer 118 and all other system users are blocked from accessing it). Another similar feature allows the system administrator to deactivate a user profile without deleting it. Both of these features allow the system administrator to modify access to remote computers and modify user profiles with simple commands in lieu of physical disconnection of remote computers 118 or regeneration of user profiles.

When routing the keyboard, cursor control device, administrative, audio and auxiliary peripheral device signals from multimedia CIM 116 to multimedia UST 108, these signals are received from multimedia CIM 116 in the form of a data packet, as illustrated in FIG. 5, through ports 202 onto peripheral bus 220. Thereafter, the data packets are transmitted to peripheral switch 214, which transmits the received data packet to the appropriate first transceiver 241. First transceiver 241 then transmits the signals to MSU central processing unit ("CPU") 212 for processing. MSU CPU 212 processes the received data packet and generates a new data packet.

Figure 3B:
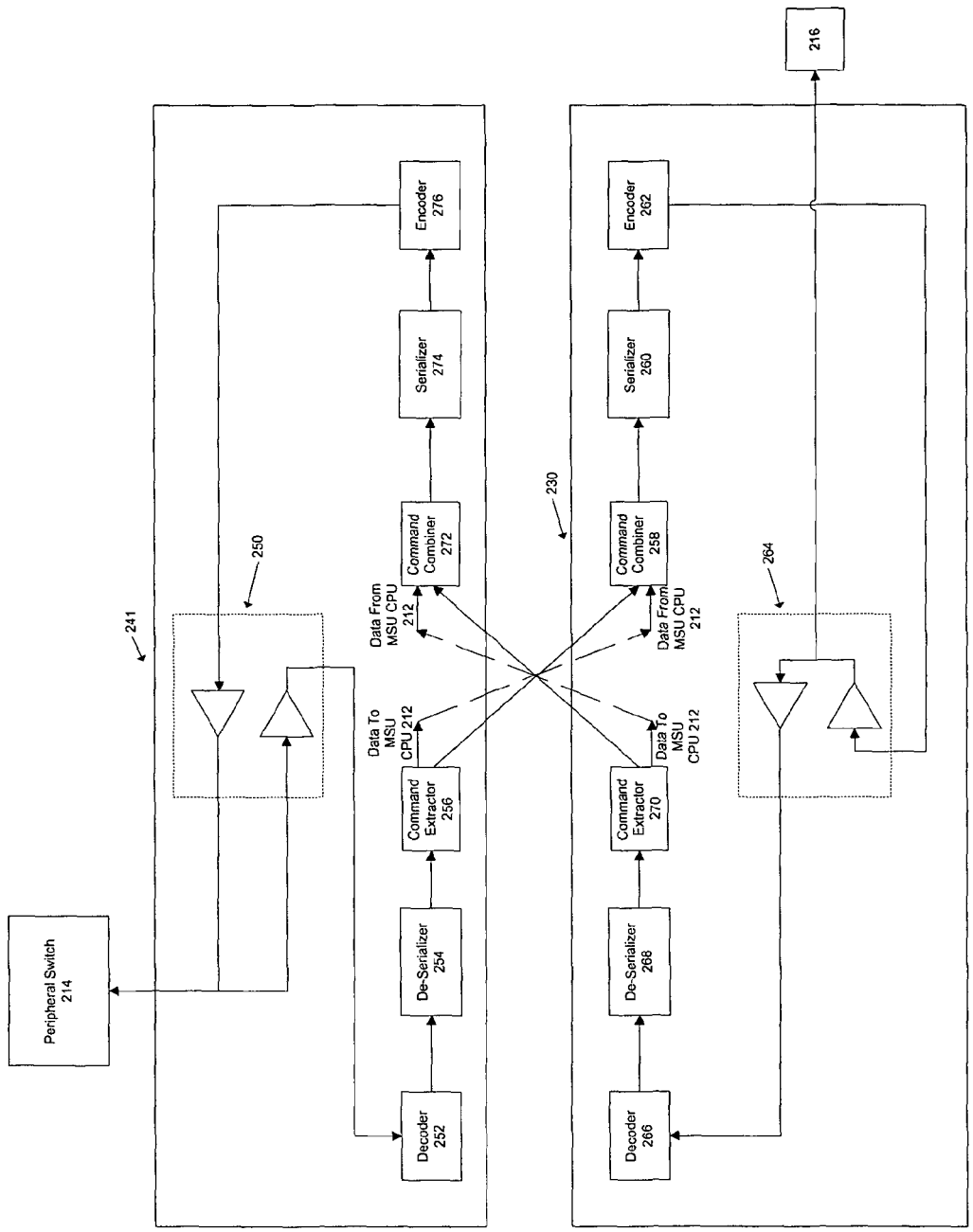
FIG. 3B is a detailed schematic diagram of the preferred embodiment of the first and second transceivers located within the MSU shown in FIG. 3A.

As shown in FIG. 3B, which depicts a schematic diagram of the preferred embodiment of first transceiver 241 and second transceiver 230, the data packet arrives from peripheral switch 214 at signal converter 250 which converts the data packet from a differential form to its original form. The data packet is then transmitted to decoder 252 (preferably a Manchester decoder) which decodes the encoded data packet. After the data packet has been processed by decoder 252, the data packet is de-serialized by de-serializer 254 which converts the serial stream of bits in the data packet into parallel streams of bits. Command extractor 256 then processes the de-serialized data packet to remove the portion of the data packet relating to keyboard, cursor control device, and administrative signals. MSU CPU 212 utilizes the removed portion of the data packet to determine the proper second transceiver 230 to which to transmit the remainder of the data packet.

The remainder of the data packet is then transmitted from command extractor 256 to command combiner 258 located in second transceiver 230 as determined by MSU CPU 212. Command combiner 258 appends a new set of keyboard, cursor control device, and administrative signals created by MSU CPU 212 to the data packet received from command extractor 256. The data packet is then serialized by serializer 260 and encoded by encoder 262. Next, signal converter 264 conditions the data packet for transmission over a single CAT 5 cable by converting the data packet to a differential signal for transmission over a single twisted pair located in the CAT 5 cable and by applying the proper network protocol to the data packet. The data packet is then transmitted to port 216. Alternatively, under software control, the entire data packet may be transmitted from command extractor 256 to command combiner 258 without passing through MSU CPU 212 as previously described (shown as dotted line arrow). When in this "by-pass" mode of operation, the data packet is still being sent to MSU CPU 212.

Similarly, data packets containing encoded keyboard, cursor control device, administrative, audio, and auxiliary peripheral device signals are also transmitted to peripheral switch 214 from port 216 utilizing first transceiver 241 and second transceiver 230. In this scenario, the data packet arrives from port 216 at signal converter 264 located in second transceiver 230 which converts the data packet from a differential form to its original form. Signal converter 264 also removes network protocol conditioning which occurs when the data packet is transmitted over a single CAT 5 cable. The data packet is then transmitted to decoder 266. After the data packet has been processed by decoder 266, the data packet is de-serialized by de-serializer 268. Command extractor 270 then processes the de-serialized data packet to remove the portion of the data packet relating to keyboard, cursor control device, and administrative signals. MSU CPU 212 utilizes the removed portion of the data packet to determine the proper first transceiver 241 to which to transmit the remainder of the data packet. Alternatively, under software control, the entire data packet may be transmitted from command extractor 270 to command combiner 272 without passing through MSU CPU 212 as previously described.

The remainder of the data packet is then transmitted from command extractor 270 to command combiner 272 located in first transceiver 241 as determined by MSU CPU 212. Command combiner 272 appends a new set of keyboard, cursor control device, and administrative signals created by MSU CPU 212 to the data packet received from command extractor 270. The data packet is then serialized by serializer 274 and encoded by encoder 276. Next, signal converter 250 conditions the data packet for transmission over a single CAT 5 cable by converting the data packet to a differential signal for transmission over a single twisted pair located in the CAT 5 cable and by applying the proper network protocol to the data packet. The data packet is then transmitted to peripheral switch 214.

Thereafter, the information pertaining to the new data packet is transmitted to the appropriate second transceiver 230 which creates and serializes the data packet and transmits it to port 216 for transmission via single cable 110 to the desired multimedia UST 108 (FIG. 1). Multimedia UST 108 then processes the data packet and emulates keyboard, cursor control device, audio, and auxiliary peripheral device signals to keyboard 102, cursor control device 106, UST audio output device 120, and UST I/O module 124, respectively (FIG. 1).

Similarly, MSU 112 also transmits keyboard, cursor control device, administrative, audio, and auxiliary peripheral device signals from multimedia USTs 108 to multimedia CIMs 116 (FIG. 1). In this scenario, these signals are received at multimedia UST 108 from the respective connected devices, wherein information relating to the received signals is packetized and transmitted via cable 110 to the port 216 located at MSU 112. Thereafter, the data packet is transmitted to second transceiver 230, which de-serializes it and transmits it to MSU CPU 212. MSU CPU 212 interprets the information contained in the data packet and creates information to be contained in a new data packet, as discussed above. The information relating to the new data packet is then transmitted to the specific first transceiver 241 that is associated with the desired remote computer 118. First transceiver 241 creates and serializes the data packet and transmits it to peripheral switch 214, which transmits the data packet to the desired port 202 via peripheral bus 220. Subsequently, the data packet is transmitted via cable 114 to the specific multimedia CIM 116 that is connected to the desired remote computer 118 (FIG. 1). Multimedia CIM 116 processes the data packet and emulates the keyboard, cursor control device, audio, and auxiliary peripheral device to the corresponding devices.

Figure 4A:
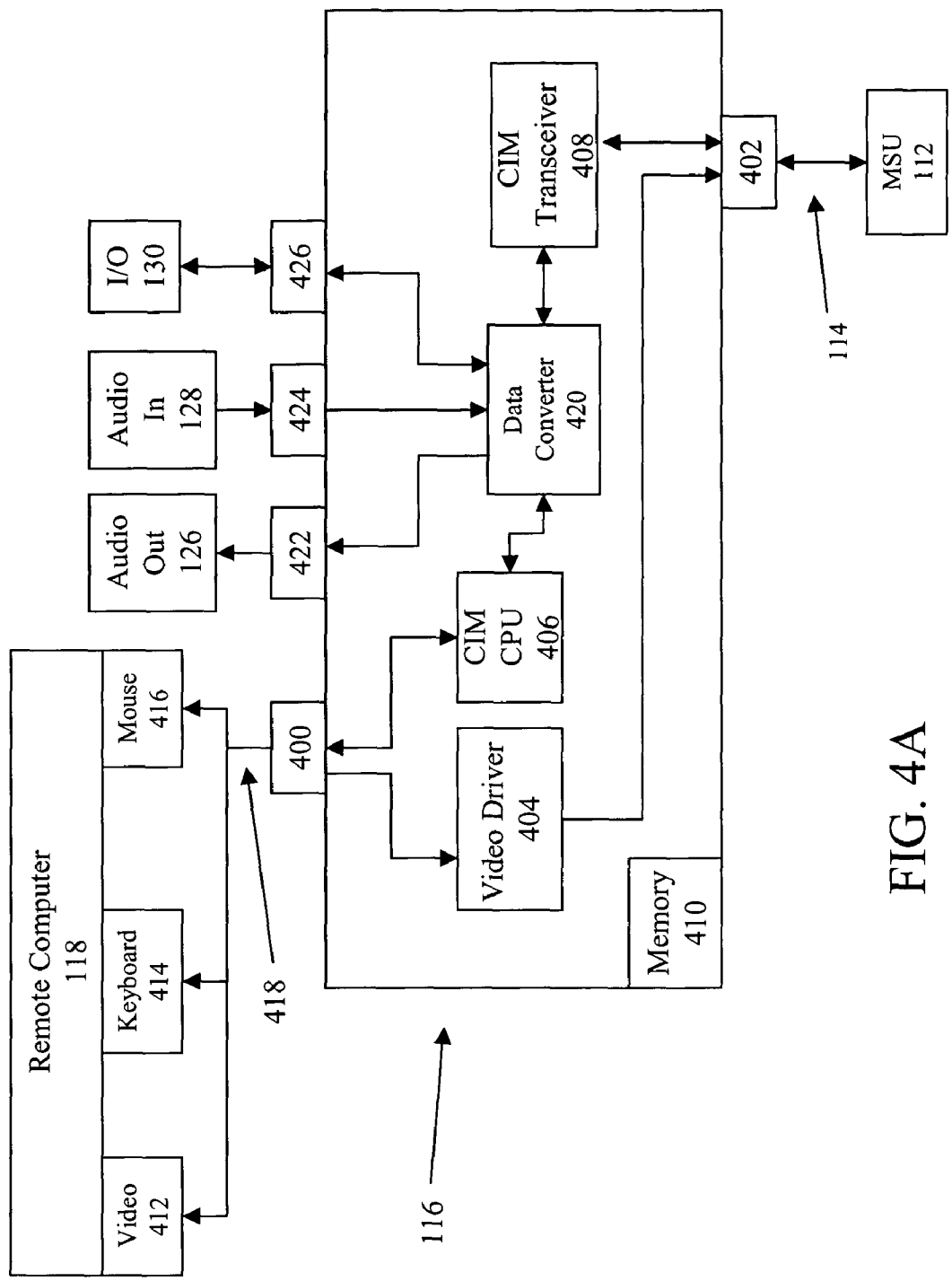
FIG. 4A is a schematic representation of the preferred embodiment of the internal structure of the multimedia CIM shown in FIG. 1, illustrating connection of the CIM to a connected computer and to an MSU.

Turning next to FIG. 4A, shown is a schematic diagram of the interior of multimedia CIM 116. Multimedia CIM 116 is compatible with all present day computer systems including, but not limited to, those manufactured by Microsoft (Windows), Apple (Macintosh), Sun (Unix), DEC, Compaq (Alpha), IBM (RS/6000), HP (HP9000), and SGI. However, it is foreseeable that the technology of the present invention will also be compatible with those computer systems not yet contemplated.

Multimedia CIM 116 interfaces video port 412, keyboard port 414, and cursor control device port 416 of remote computer 118 to the intelligent, modular computer management system of the present invention. Multimedia CIM 116 also interfaces CIM audio output device 126, CIM audio input device 128, and CIM I/O module 130 to the computer management system of the present invention. However, these devices may either be integral to or independent from remote computer 118. For example, multimedia CIM 116 may interface directly to the audio in port and audio out port of remote computer 118 or may interface to an independent audio input device, such as a microphone, and an independent audio output device, such as a speaker.

Video port 412, keyboard port 414, and cursor control device port 416 of remote computer 118 are connected to port 400 of multimedia CIM 116 via a specially manufactured modular cable 418. Modular cable 418 contains a first end with a connector for coupling modular cable 418 to multimedia CIM 116, and a second end containing three connectors for coupling modular cable 418 to video port 412, keyboard port 414, and cursor control device port 416. Preferably, separate audio ports 422 and 424 are used for connecting audio output device 126 and audio input device 128. In an alternate embodiment, a five or six prong modular cable can be specially manufactured to allow port 400 of multimedia CIM 116 to connect to the video, keyboard, cursor control device, audio in, and audio out ports of remote computer 118, and optionally to CIM I/O module 130. In yet another embodiment, multimedia CIM 116 may be connected to the audio input and audio out ports of remote computer 118 via industry standard audio cabling.

In the preferred embodiment of the present invention, multimedia CIM 116 may be connected to the audio input and audio out ports of remote computer 118, CIM audio output device 126, and CIM audio input device 128 via a multipurpose audio cable. The multipurpose audio cable contains a first end that couples to CIM audio in port 424 and CIM audio out port 422. The second end of the multipurpose cable contains two audio input connectors and two audio output connectors. The two audio input connectors couple to CIM audio input device 128 and the audio out port of remote computer 118. The two audio output connectors couple to CIM audio output device 126 and the audio in port of remote computer 118. This cable configuration allows a system user to send audio to both CIM audio output device 126, such as speakers, and to the audio in port of remote computer 118. Furthermore, the multipurpose cable allows a system user to receive audio generated either internal to remote computer 118 or externally, such as a person speaking into a microphone that is connected to multimedia CIM 116. Optionally, the audio cable may contain a switching mechanism for switching between the two input connectors and the two output connectors located at the second end of modular cable.

In the preferred embodiment of the present invention, CIM I/O module 130 is connected to CIM I/O port 426 via a 40-pin ribbon cable. However, as discussed above with respect to UST I/O module 124, it will be apparent to one of skill in the art that multimedia CIM 116 and CIM I/O module 130 can be designed to utilize any type of cabling to couple CIM I/O module 130 to multimedia CIM 116. Also, as discussed above with respect to UST I/O module 124, CIM I/O module 130 may be designed to include one or more ports, including varying types of ports, which interface one or more auxiliary peripheral devices to CIM I/O module 130.

CIM CPU 406 receives keyboard and cursor control device signals from keyboard port 414 and cursor control device port 416 of remote computer 118, respectively. Thereafter, CIM CPU 406 analyzes the received signals and transmits information to CIM transceiver 408 via data converter 420 to be used during generation of a data packet. Simultaneously, data converter 420 receives signals from CIM I/O module 130 and CIM audio input device 128 via CIM I/O port 426 and CIM audio in port 424, respectively. The I/O module signals and audio signals are processed by data converter 420 and transmitted to CIM transceiver for transmission to MSU 112 via port 402 and cable 114.

Figure 4B:
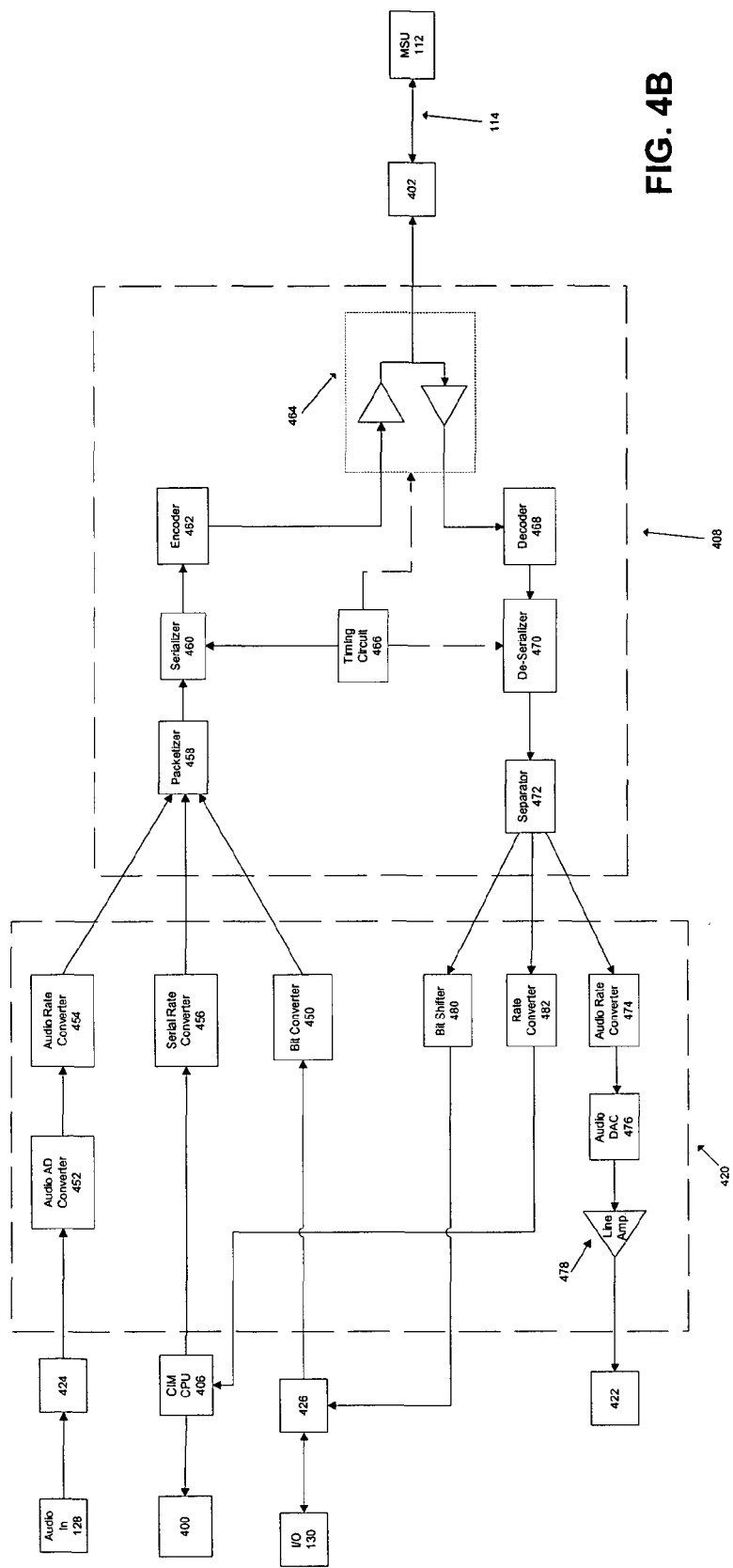
FIG. 4B is a detailed schematic diagram of the preferred embodiment of the CIM transceiver and data converter located within the CIM of FIG. 4 in accordance with the present invention.

FIG. 4B shows a schematic diagram of the preferred configuration of CIM transceiver 408 and data converter 420. As shown, the CIM I/O module signals are received from CIM I/O module 130 via CIM I/O port 426 and are input to bit converter 450 located in data converter 420. Similarly, the audio signals are received from CIM audio input device 128 via UST audio in port 424 and are converted to digital signals by analog-digital converter ("AD converter") 452. The resulting digitized audio signals are input to audio rate converter 454 which formats the rate of data flow. Additionally, signals relating to the keyboard and cursor control device information are received from CIM CPU 406 and are input to serial rate converter 456 which serializes the keyboard and cursor control device signals.

CIM transceiver 408 combines the signals received from audio rate converter 454, serial rate converter 456, and bit converter 450 to create data packets in packetizer 458 as discussed in further detail with respect to FIG. 5. It should be noted that the I/O module signals typically contain the same information as the auxiliary peripheral device signals mentioned above. The reason for this is that CIM I/O module 130 and UST I/O module 124 are used to interface auxiliary peripheral devices to multimedia CIM 116 and multimedia UST 108, respectively. In addition, the data packet contains overhead data, also discussed in more detail regarding FIG. 5. Thereafter, CIM transceiver 408 converts the data packets to a serial format utilizing serializer 460 and encodes the data packet utilizing encoder 462. Signal converter 464 then conditions the data packet for transmission over cable 114 by converting the data packet to a differential signal for transmission over a single twisted pair located in cable 114 and by applying the proper network protocol to the data packet. The data packet is then transmitted to port 402 for transmission to MSU 112 via cable 114. Timing circuit 466 directs serializer 460 and signal converter 464 to create a new data packet every twenty five (25) microseconds to ensure constant data flow.

Keyboard, cursor control device, I/O module, and audio signals in the form of a data packet are received from MSU 112 via cable 114 at port 402. Signal converter 464 located in CIM transceiver 408 converts the data packet from a differential form to its original form and removes network protocol conditioning performed by MSU 112. The data packet is next decoded by decoder 468 and de-serialized by de-serializer 470. Timing circuit 466 instructs de-serializer 470 to de-serialize a data packet every twenty (20) microseconds to ensure constant data packet flow. The data packet is then processed by separator 472 which parses the data packet into its original components.

The received audio signals are processed by audio rate converter 474. The digital audio signals are then converted to analog signals in audio digital-to-analog converter ("DAC converter") 476 and undergo signal amplification by signal amplifier 478. The amplified analog audio signals are then applied to CIM audio out port 422.

The received I/O module signals are conditioned by bit shifter 480 and transmitted to CIM I/O module 130 via CIM I/O module port 426. The keyboard and cursor control device signals are processed by rate converter 482 and passed through data converter 420 to CIM CPU 406 which uses the information contained in the signals to emulate keyboard and cursor control device signals. These emulated signals are applied to keyboard 102 and cursor control device 106 via keyboard port 400 and cursor control device port 410, respectively (FIG. 4A).

Similarly, keyboard, cursor control device, I/O module, and audio signals received from MSU 112 via cable 114 (FIG. 1) are received via port 402. CIM transceiver 408 receives, de-serializes, and transmits these signals to data converter 420. Data converter 420 processes the audio signals and transmits the audio signals to CIM audio output device 126 via CIM audio out port 422. The received I/O module signals are processed by data converter 420 and then transmitted to CIM I/O module 130 via CIM I/O port 426. The keyboard and cursor control device signals are processed by data converter 420 and then are passed to CIM CPU 406, which uses the information contained in the signals to emulate keyboard and cursor control device signals. These emulated signals are applied to keyboard port 414 and cursor control device port 416 via port 400.

As discussed in greater detail above for FIG. 2A with respect to UST CPU 308, CIM CPU 406 is also programmed to emulate keyboard and cursor control device signals that are compatible with the communication protocol of the connected remote computer 118, even though the original keyboard and cursor control device signals generated at the origination multimedia UST 108 may not be compatible with the remote computer's protocol.

Video signals are transmitted from video port 412 of remote computer 118 to multimedia CIM 116 via modular cable 418 to port 400. From port 400, the video signals are transmitted to video driver 404, which converts the standard red, green, and blue components of the video signal to differential signals for transmission through port 402 to cable 114. Each color signal is transmitted via its own twisted pair cable contained within cable 114 (when transmitted from multimedia CIM 116 to MSU 112) and single cable 110 (when transmitted from MSU 112 to multimedia UST 108) (FIG. 1). Furthermore, video driver 404 appends the horizontal and vertical synchronization signals to one of the red, green, or blue video signals to allow all five components of the video signal to be transmitted via only three twisted pair cables of cables 110 or 114. That is, the horizontal and vertical synchronization signals are each transmitted on their own color signal—not the same color signal.

Furthermore, multimedia CIM 116 contains memory unit 410, which stores the address and status of the connected remote computer 118. Thus, if a specific remote computer 118 is not functioning properly, it is easy to assess which remote computer 118 has malfunctioned. In addition, the device address facilitates proper switching of the keyboard, cursor control device, audio, and auxiliary peripheral device signals since the device address is included in the generated data packets that contain the transmitted signal information. Therefore, the information contained in memory unit 410 maintains the modular nature of the computer management system of the present invention.

Finally, in the preferred embodiment of the present invention, remote computer 118 provides power to multimedia CIM 116. Thus, the preferred embodiment of the present invention eliminates the equipment, cabling, and space required for a dedicated multimedia CIM 116 power source.

Figure 6:
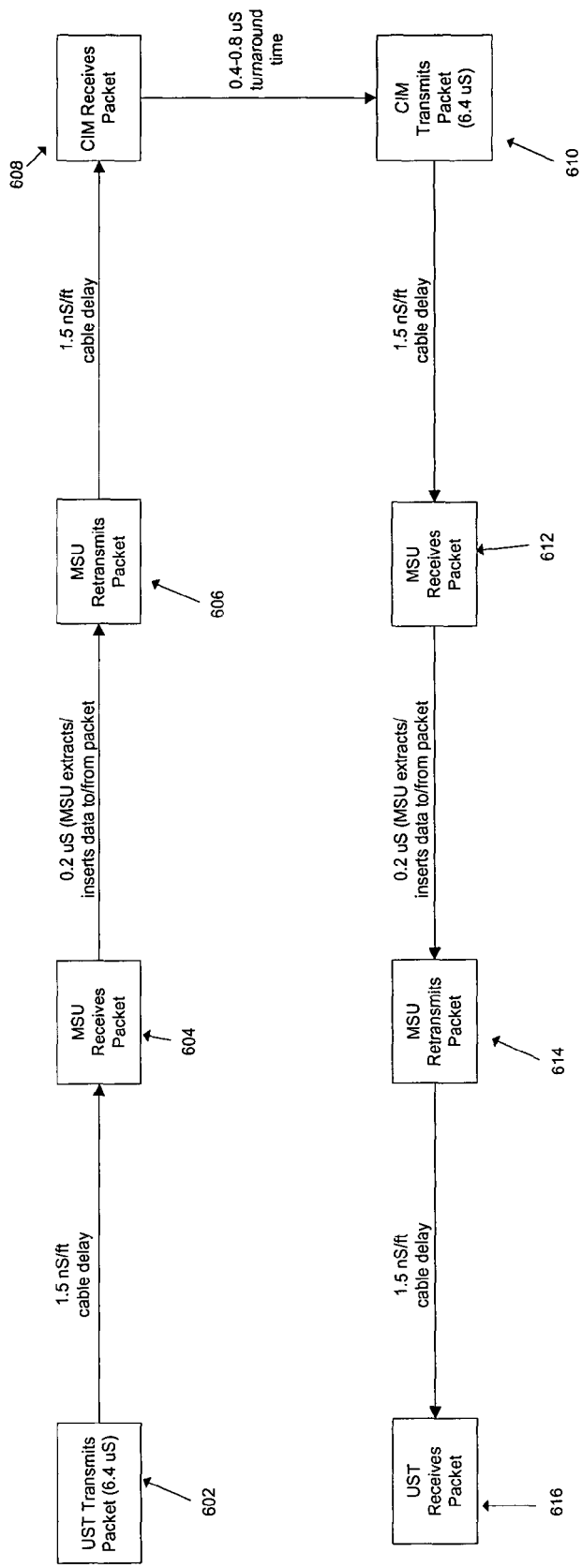
FIG. 6 is a timing diagram showing the transmission of a data packet from a multimedia UST to a multimedia CIM via an MSU and from a multimedia CIM to a multimedia UST via an MSU according to the preferred embodiment of the present invention.

Referring now to FIG. 6, shown is a timing diagram depicting the transmission of data packet 500 from multimedia UST 108 to multimedia CIM 116 and vice versa according to the preferred embodiment of the invention. Multimedia CIM 116 initially forms a data packet from the keyboard, cursor control device, administrative, audio, and auxiliary peripheral device signals. Multimedia UST 108 conditions the data packet for transmission to MSU 112 via cable 110 (FIG. 1) in UST transmission step 602. Typically, the formation of the data packet takes approximately 6.4 microseconds. While undergoing transmission, the data packet experiences approximately a 1.5 nanosecond per foot cable delay.

The data packet is received at MSU 112 step 604. As previously described, MSU 112 processes the data packet to determine the proper multimedia CIM 116 to which to transmit the data packet. This processing typically takes about 0.2 microseconds. MSU 112 then retransmits the data packet to multimedia CIM 116 via cable 114 step 606. Again, the data packet experiences about a 1.5 nanosecond per foot cable delay while being transmitted over cable 114.

Multimedia CIM 116 receives and processes the data packet in step 608. The keyboard, cursor control device, audio, and auxiliary peripheral device signals are then transmitted to the appropriate attached peripheral devices (FIG. 4A and FIG. 4B). In response to the inbound data packet, multimedia CIM 116 prepares a new data packet containing keyboard, cursor control device, administrative, audio, and auxiliary peripheral device signals formed at remote computer 118. The formation of the new outbound data packet by multimedia CIM 116 takes approximately 6.4 microseconds. After the formation of the new outbound data packet is complete, multimedia CIM 116 transmits the data packet to MSU 112 via cable 114 in step 610. The data packet experiences about a 1.5 nanosecond per foot cable delay during transmission over cable 114.

MSU 112 receives the data packet from multimedia CIM 116 step 612. MSU 112 processes the data packet to determine the proper multimedia UST 108 to which to transmit the data packet. This processing typically takes about 0.2 microseconds. MSU 112 then retransmits the data packet to multimedia UST 108 via single cable 110 in step 614. The data packet experiences approximately a 1.5 nanosecond per foot cable delay while being transmitted over cable 110 to multimedia UST 108.

The data packet is received at multimedia UST 108 in step 616. Once the data packet has been received, multimedia UST 108 transmits a new data packet to multimedia CIM 116 according to the timing diagram just described. Transmission of a data packet from multimedia UST 108 to multimedia CIM 116 and from multimedia CIM 116 to multimedia UST 108 takes approximately twenty (20) microseconds for completion. Importantly, the timing diagram of FIG. 6 is merely exemplary of the timing of the data packets within the system according to the invention. Other transmission times are possible while maintaining the purpose and function of the invention.

Figure 7:
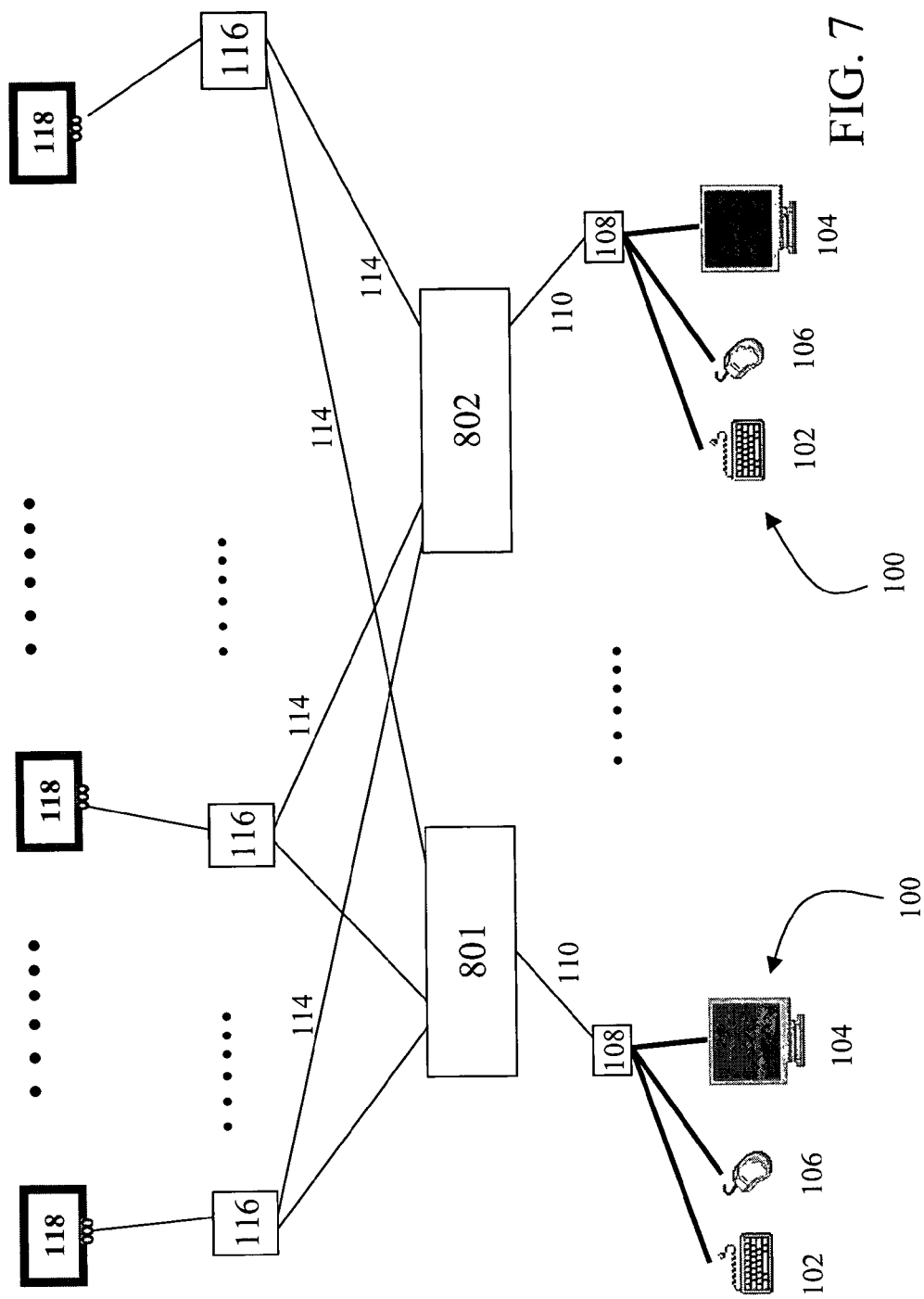
FIG. 7 is a schematic representation of an alternate configuration of the computer management system for use with the present invention illustrating connection of multiple user workstations and multiple connected computers to multiple MSUs, wherein the alternate embodiment may accommodate as many as sixty-four (64) user workstations and ten thousand (10,000) connected computers.

Referring next to FIG. 7, disclosed is an alternate embodiment of the intelligent, modular computer management system of the present invention in which the system is expanded to include two MSUs 801 and 802, each having eight (8) inputs and thirty-two (32) outputs. This configuration allows sixteen (16) USTs 108 to access and operate thirty-two (32) connected computers 118. In this alternate embodiment, each UST 108 may be linked to either first MSU 801 or second MSU 802 via cable 110. All signals received at UST 108 are transmitted via its connected MSU (i.e., either first MSU 801 or second MSU 802) to CIM 116 that is connected to the desired connected computer 118. In this alternate embodiment, CIM 116 provides connectors for two (2) cables 114 to allow it to connect to both first MSU 801 and second MSU 802. Thus, CIM 116 allows sixteen (16) user workstations 100 to operate thirty-two (32) connected computers 118.

In addition, this embodiment allows two (2) user workstations 100 to simultaneously access and operate the same connected computer 118. Alternatively, this embodiment allows a first user workstation 100 to inform a second user workstation 100 that a connected computer 118 is in use and, therefore, access to it is restricted.

Figure 8:
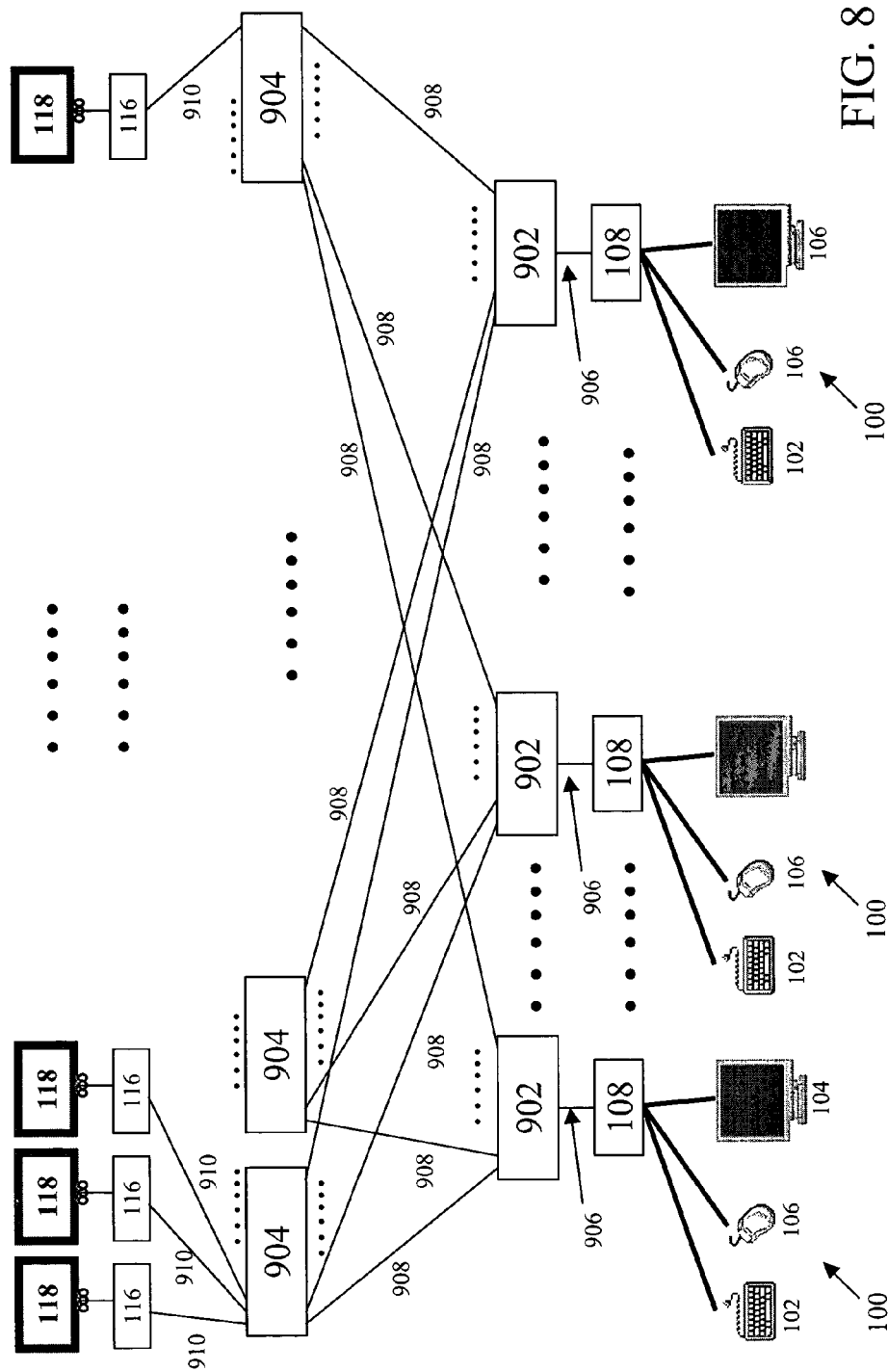
FIG. 8 is a schematic representation of an alternate embodiment of the computer management system of the present invention, wherein the computer management system is contained in a single unit that is directly connected to all connected computers and user workstations.

Turning next to FIG. 8, disclosed is another alternate embodiment of the remote computer management system of the present invention. The use of forty (40) total MSUs (i.e., eight (8) first tier MSUs 902 and thirty-two (32) second tier MSUs 904), wherein each first tier MSU 902 and second tier MSU 904 has eight (8) inputs and thirty-two (32) outputs, allows sixty-four (64) user workstations 100 to operate and access one thousand twenty four (1,024) connected computers 118. In this alternate embodiment, each UST 108 is directly linked to one of eight (8) first tier MSUs 702 via single CAT 5 cable 906. First tier MSU 902 transmits all signals received from user workstation 100 via single CAT 5 cable 908 to second tier MSU 904 that is connected to the CIM 116 associated with the desired connected computer 118. Second tier MSU 904 then transmits the received signals to the respective CIM 116 via single CAT 5 cable 910, whereupon CIM 116 applies these signals to the respective ports of connected computer 118. In this embodiment, the second tier of MSUs 904 comprises thirty-two (32) units. Each second tier MSU 904 is coupled to multiple CIMs 116, which provide a direct connection to each of the one thousand twenty four (1,024) potential connected computers 118 via single CAT 5 cables 910.

Although FIG. 8 depicts the configuration used to access and control one thousand twenty four (1,024) connected computers 118 from sixty-four (64) user workstations 100, many other system configurations are available to allow a greater number of user workstations 100 to be connected to a greater number of connected computers 118. For example, the number of MSU tiers may be increased, or, alternatively, hubs may be incorporated. Also, each MSU may be designed to comprise more than eight (8) inputs and more than thirty-two (32) outputs to further increase the system capacity.

While the present invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

We claim:

1. A computer-readable storage medium encoded with a computer program comprising instruction that, when executed, operate to cause a computer management system to perform operations comprising:
   receiving keyboard signals, video signals, mouse signals, and audio signals at a transmission node;
   forming a 64 bit data packet comprising
      a first section of 2 bits including overhead data,
      a second section of 34 bits including audio signals,
      a third section of 10 bits including keyboard and mouse signals, and
      a fourth section of 18 bits including auxiliary data;
   encoding a vertical synchronization signal onto one of a red, blue, and green component of said video signals;
   encoding a horizontal synchronization signal onto one of said red component, said blue component, and said green component of said video signals;
   transmitting said data packet to a receiving node via a first pair of wires in an eight conductor cable;
   wherein the receiving at a transmission node and transmitting of said data packets to a receiving node occurs within a defined time limit
   transmitting said red component of said video signals to said receiving node via a second pair of wires in said eight conductor cable;
   transmitting said blue component of said video signal to said receiving node via a fourth pair of wires in said eight conductor cable; and
   transmitting said green component of said video signal to said receiving node via a third pair of wires in said eight conductor cable.

2. A computer-readable storage medium according to claim 1, further comprising:
   converting said data packet to a differential signal;

converting said red component of said video signals to a differential signal;
converting said green component of said video signals to a differential signal; and
converting said blue component of said video signals to a differential signal.

3. A computer-readable storage medium according to claim 1, wherein said audio device is selected from the group consisting of a microphone, an analog playback device, a digital playback device, a cassette player, a compact disc player, a Digital Video Disc player, a television, a computer, a telephone, a cellular telephone, a projector, a camera, and a personal digital assistant.

4. A computer-readable storage medium according to claim 1, wherein said audio device is at least one of an audio in port of said computer and an audio out port of said computer.

5. A computer-readable storage medium according to claim 1, wherein said audio device is selected from the group consisting of a speaker, an audio headset, a projector, an analog audio recording device, a digital audio recording device, a second computer, a cassette recorder, a Compact Disc writer, a Digital Video Disc writer, a television, a camera, a telephone, a cellular telephone, and a personal digital assistant.

6. A computer-readable storage medium encoded with a computer program comprising instruction that, when executed, operate to cause a computer management system a computer to perform operations comprising:
receiving keyboard signals, video signals, mouse signals, and auxiliary peripheral device signals at a transmission node;
forming a 64 bit data packet comprising
a first section of 2 bits including overhead data,
a second section of 34 bits including audio signals,
a third section of 10 bits including keyboard and mouse signals, and
a fourth section of 18 bits including auxiliary data;
encoding a vertical synchronization signal onto one of a red, blue, and green component of said video signals;
encoding a horizontal synchronization signal onto one of said red component, said blue component, and said green component of said video signals;
transmitting said data packet to a receiving node via a first pair of wires in an eight conductor cable;
wherein the receiving at a transmission node and transmitting of said data packets to a receiving node occurs within a defined time limit
transmitting said red component of said video signals to said receiving node via a second pair of wires in said eight conductor cable;
transmitting said blue component of said video signal to said receiving node via a fourth pair of wires in said eight conductor cable;
and transmitting said green component of said video signal to said receiving node via a third pair of wires in said eight conductor cable.

7. A computer-readable storage medium according to claim 6, further comprising the steps of:
converting said data packet to a differential signal;
converting said red component of said video signals to a differential signal;
converting said green component of said video signals to a differential signal; and
converting said blue component of said video signals to a differential signal.

8. A computer-readable storage medium according to claim 6, wherein said auxiliary peripheral device is selected from the group consisting of a serial port device, a Universal Serial Bus device, a Recommended Standard device, a PS/2 device, a parallel device, a firewire device, a Registered Jack device, a Registered Jack device, a Registered Jack device, a Registered Jack device, a British Naval Connector device, a Centronics device, an Advanced Technology device, a Digital Video Interface device, an Integrated Development Environment device, a Fiber Distributed Data Interface device, a switch closure device, or a Small Computer System Interface device.

9. A computer-readable storage medium according to claim 6, wherein said auxiliary peripheral device is selected from the group consisting of a keyboard, a mouse, an optical mouse, a trackball, a Universal Serial Bus keyboard adapter, a Universal Serial Bus mouse adapter a second computer, a port expander, a Bluetooth device, a cellular telephone, a web camera, a floppy disk drive, a hard disk drive, a Universal Serial Bus Flash Drive, a digital media reader, a digital media writer, a microphone, a speaker, a subwoofer, a scanner, a copier, a printer, a projector, a television, an analog monitor, a digital monitor, a video capture device, a modem, a hub, a router, a switch, a cable modem, a Digital Subscriber Line modem, a wireless network hub, a wireless network router, a wireless access point, a print server, a wireless print server, an Ethernet adapter, an analog audio playback device, an analog audio recording device, a digital audio playback device, a digital audio recording device, a tape drive, a storage backup device, a joystick, a game pad, a power supply, an uninterruptible power supply, a Universal Serial Bus hub, a Compact Disc Read Only Memory device, a Compact Disc write device, a Compact Disc re-write device, an audio device, a Digital Video Disc Random Access Memory device, a camera, a cassette recorder, a headset, a camcorder, and a personal digital assistant.

10. The computer-readable storage medium according to claim 1, wherein the defined time limit allows for the transmission of high quality audio.

11. The computer-readable storage medium according to claim 1, wherein the defined time limit is about 6.0 to 8.1 microseconds.

12. The computer-readable storage medium according to claim 6, wherein the defined time limit allows for the transmission of high quality audio.

13. The computer-readable storage medium according to claim 6, wherein the defined time limit is about 6.0 to 8.1 microseconds.

* * * * *